United States Patent [19]

Small

[11] Patent Number: 5,777,623

[45] Date of Patent: Jul. 7, 1998

[54] APPARATUS AND METHOD FOR PERFORMING PERSPECTIVELY CORRECT INTERPOLATION IN COMPUTER GRAPHICS IN A VARIABLE DIRECTION ALONG A LINE OF PIXELS

[75] Inventor: Jonathan Andrew Stanley Small, Buryfields, Great Britain

[73] Assignee: Canon Kabushiki Kaisha, Tokyo, Japan

[21] Appl. No.: 602,128

[22] Filed: Feb. 15, 1996

[51] Int. Cl.$^6$ .................................................. G06T 15/00
[52] U.S. Cl. .................................................. 345/430
[58] Field of Search .................................. 395/130, 118, 395/126, 119, 125, 127, 128, 129, 133; 345/430, 418, 426, 419, 425, 427, 428, 429, 433

[56] References Cited

U.S. PATENT DOCUMENTS 5,594,854  1/1997  Baldwin et al. ..................... 395/141

FOREIGN PATENT DOCUMENTS

637813A2  2/1994  European Pat. Off. .

OTHER PUBLICATIONS

Hecker "Perspective Texture Mapping by Chris Hecker" Part III Endpoints and Mapping, Sep. 1995.
"Computer Graphics Principles and Practice" by Foley, van Dam, Feiner and Hughes, 2nd Edition, Addision-Wesley Publishing Company, ISBN 0-201-12110-7, pp. 741 to 745.
"Hyperbolic Interpolation" by James F Blinn in Jim Blinn's Corner, IEEE Computer Graphics and Applications, Jul. 1992.
"The Art of Electronics" by Horowitz and Hill, Cambridge University Press, 2nd Edition, ISBN 0-521-37095-7, pp. 738 to 741.

Primary Examiner—Almis R. Jankus
Attorney, Agent, or Firm—Fitzpatrick, Cella, Harper & Scinto

[57] ABSTRACT

In an apparatus and method for performing perspectively correct interpolation of texture coordinates in computer graphics, an incremental interpolation technique is used to calculate pixel values along a display line from an associated texture map. In order to evaluate divisions within the hyperbolic equations relating the texture coordinates to pixel position, the incremental technique performs a log subtraction in which the log of the fractional part of a number is looked-up, while the exponent part of the number is tracked separately. The differential of each texture coordinate is tracked. Further, the incremental technique is arranged so as to render the pixels either from left to right or from right to left depending upon which edge of the polygon being rendered is closer to the viewer and hence at which of the polygon edges accumulated errors will be most visible.

41 Claims, 19 Drawing Sheets

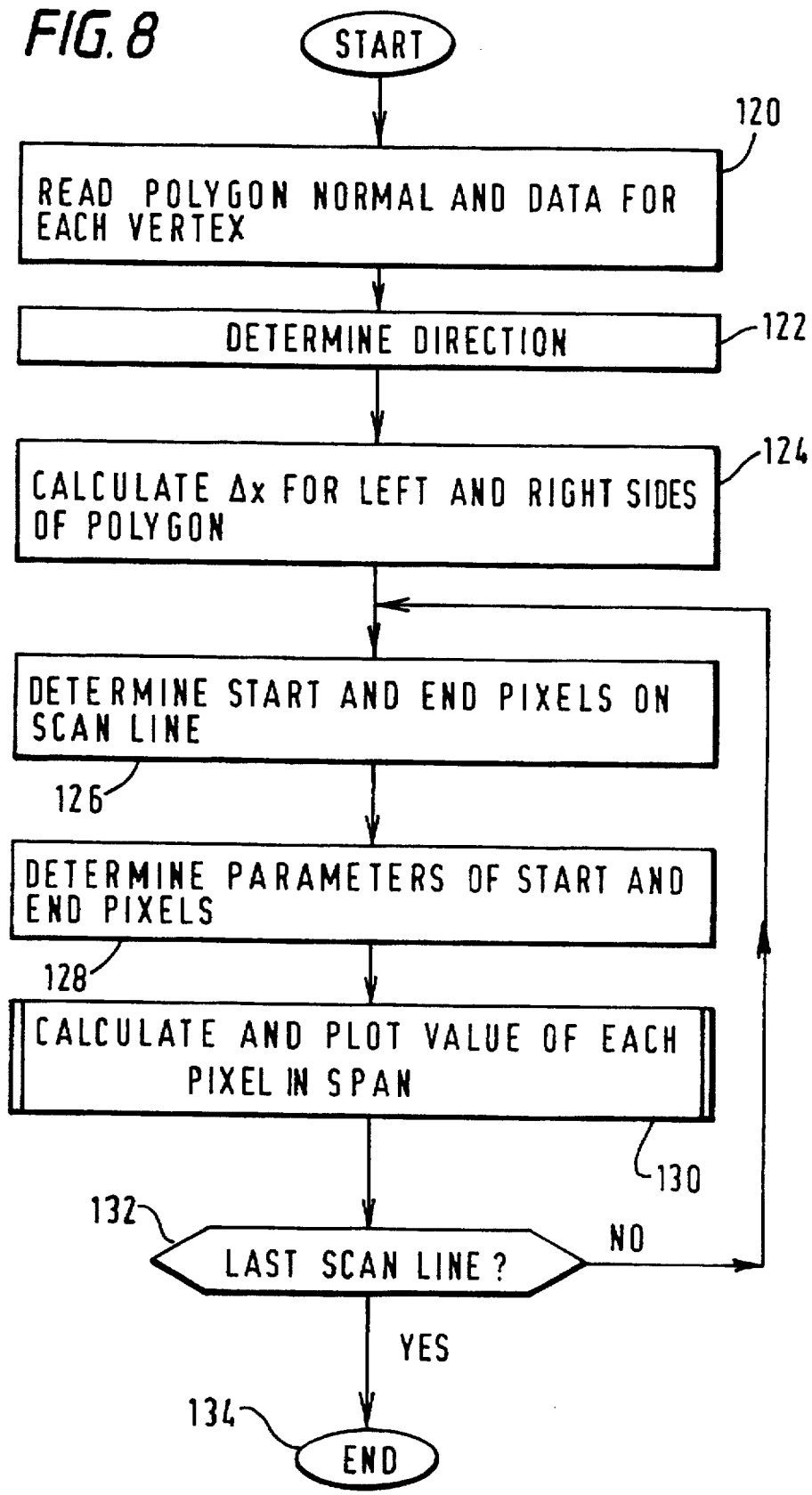

APPARATUS AND METHOD FOR PERFORMING PERSPECTIVELY CORRECT INTERPOLATION IN COMPUTER GRAPHICS IN A VARIABLE DIRECTION ALONG A LINE OF PIXELS

BACKGROUND OF THE INVENTION

1. Field of the Invention

The present invention relates to an image processing apparatus and method for performing texture mapping and similar operations, with particular application in 3-dimensional ("3D") computer graphics. The invention has particular use in interpolating parameters such as texture coordinates in perspective view.

2. Description of Prior Art

Texture mapping is well known in the art of 3-dimensional image synthesis (see for example "Computer Graphics Principles and Practice" by Foley, Van Dam, Feiner and Hughes, 2nd Edition, Addison-Wesley Publishing Company, ISBN 0-201-12110-7).

The process of texture mapping is useful for applying surface detail to 3D objects within an image to be displayed. A pre-stored image of the surface details is mapped onto the surface of an object in order to display the image. The image of the surface details is known as a "texture map" or "texture image", and is made up of individual elements called texels, residing in a two-dimensional texture coordinate space (defined by the variables U,V). The texture map may represent, for example, a colour, transparency or shadow profile etc. Similar processes are known as "bump mapping" (representing surface normal variations) and "environment mapping" (representing image reflections), and it will be understood that the present disclosure, while referring simply to "texture mapping", implicitly extends to include all such processes in which a surface property is modulated over the area of a surface primitive.

To perform texture mapping, the coordinates of a display pixel lying within an area representing the object are mapped into texture coordinate space, to identify a corresponding texel or texels. The value for the pixel is then derived from the value of the texel(s).

It is known in the art that, in a perspective projection of a 3D object from object space to display space, linear changes in pixel position produce non-linear changes in each texel coordinate. Specifically, each texel coordinate is a hyperbolic function of pixel position. This is disclosed in, for example, "Hyperbolic Interpolation" by James F Blinn in Jim Blinn's Corner, IEEE Computer Graphics and Applications, July 1992. Accordingly, to perform texture mapping with correct perspective, it has previously been necessary to evaluate two hyperbolic equations (one for each texel coordinate U and V) every time a pixel value is determined. This is very time consuming, principally since each function evaluation requires a division operation (each requiring many cycles in a typical microprocessor), and accordingly two such divisions need to be performed for every pixel, while the number of pixels to be processed is typically thousands or even millions.

The divisions per pixel may be avoided if the object to be displayed lies in a plane of constant depth in viewing space. This is because, in this special case, texel coordinates are linearly related to pixel position. Accordingly, in a number of known systems, lines of constant depth along an object surface are defined so that rendering of the pixels corresponding to these constant depth lines can be carried out. This provides good results for limited classes of simple graphic objects, such as horizontal floors and vertical walls, in a limited system where the view direction is always parallel to the floor. However, constant-depth techniques are problematic in more general graphics, since lines of constant depth often do not correspond to lines or columns of pixels on the screen, making rendering complex.

In more generally useful graphic systems, therefore, the division per pixel has always been tolerated where perspectively-correct mapping is desired, or else correct perspective has been only approximated, to increase performance on a given hardware platform, for example by replacing the hyperbola with simple linear, piecewise linear or polynomial approximations, or by dividing the polygons to be rendered into smaller ones by tessellation. Particularly in animated sequences, however, mappings without correct perspective result in unnatural motion effects ("swimming") limiting the utility of the system.

BRIEF SUMMARY OF THE INVENTION

It is an object of the invention to provide a new low-cost technique for texture mapping and similar operations with correct perspective.

According to a first aspect of the invention, perspectively correct interpolation is performed by dividing a numerator function by a denominator function using logarithms and antilogarithms. In particular, the denominator can be computed incrementally, and only the fractional part of the logarithm needs to be explicitly recomputed for each pixel, the integer part (exponent) being maintained and updated as necessary. The exponent can be updated by updating a pointer to an antilog table.

According to a second aspect of the invention, the differential of a surface parameter is computed by division per pixel, and the surface parameter itself is updated incrementally. This renders the numerator of the division constant, which can be exploited to perform the division more quickly than in conventional systems.

According to a third aspect of the invention, in a process where interpolated parameter values are subject to cumulative error along a span of pixels, the direction of processing each span of pixels is selected so as to minimise the visibility of the accumulated error. The direction may be determined once for all spans of a surface primitive, in accordance with the orientation of the surface.

Where plural surface parameters are to be computed per pixel, such as a pair of texture co-ordinates, separate numerator functions can be computed for each, to be divided by a common denominator.

BRIEF DESCRIPTION OF THE DRAWINGS

Embodiments of the invention will now be described by way of example, in conjunction with the accompanying drawings, in which:

FIG. 8 shows the steps performed in texture mapping in an embodiment of the invention.

DETAILED DESCRIPTION OF EXEMPLARY EMBODIMENTS

Figure 1:
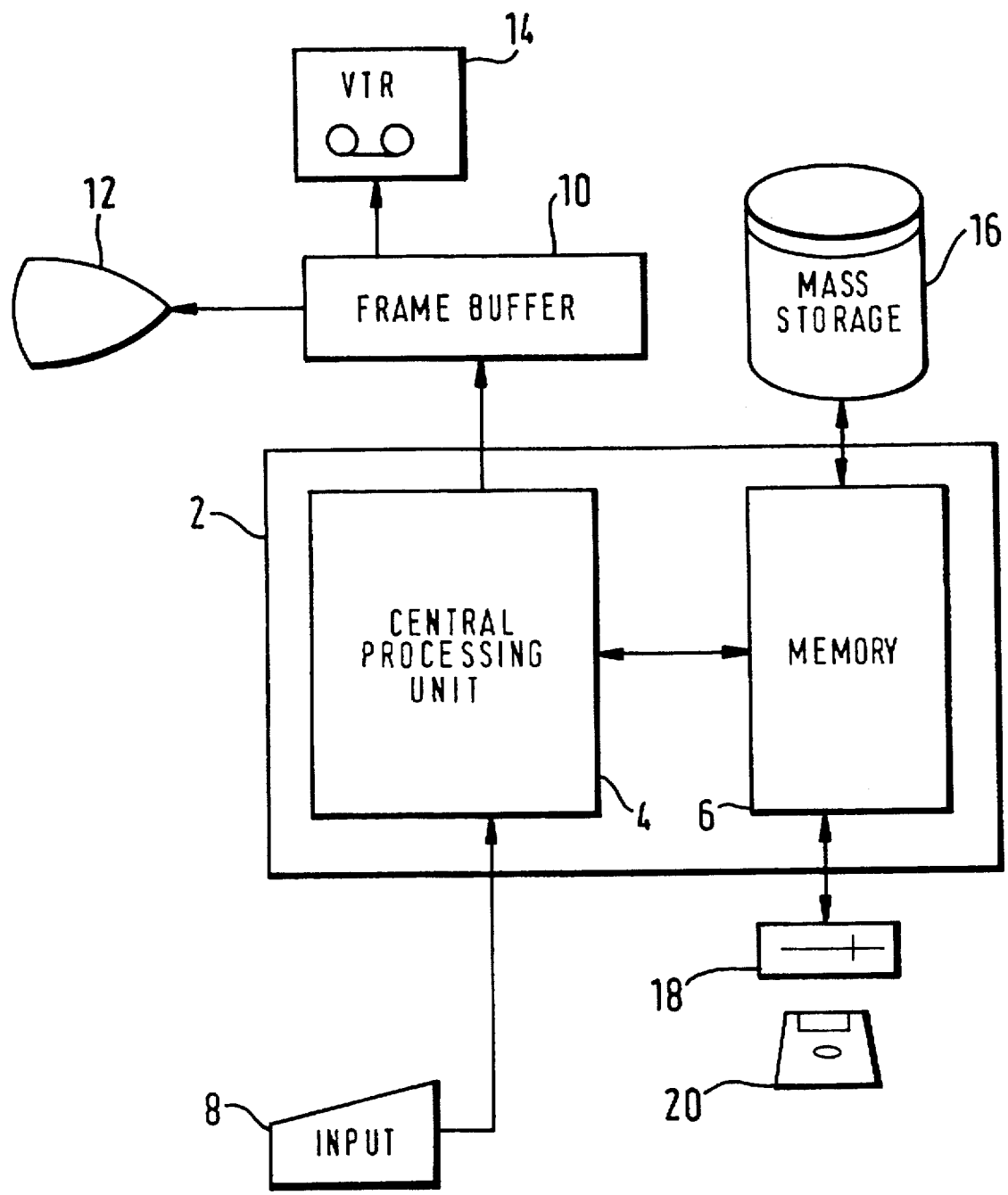
FIG. 1 is a block diagram showing the general arrangement of an image processing apparatus according to an embodiment of the invention.

FIG. 1 is a block diagram showing the general arrangement of an image processing apparatus according to an embodiment. In the apparatus, there is provided a computer 2, which comprises a central processing unit (CPU) 4 connected to a memory 6 operable to store a program defining the sequence of operations of the CPU 4, and to store object and image data used in calculations by the CPU 4.

Coupled to an input port of the CPU 4 there is an input device 8, which may comprise, for example, a keyboard and/or a position sensitive input device such as a mouse, tracker-ball, or a digitizer tablet and stylus etc.

Also coupled to the CPU 4 is a frame buffer 10 which comprises a memory unit arranged to store image data relating to at least one image, for example by providing one (or several) memory location(s) per pixel of the image. The value stored in the frame buffer for each pixel defines the colour or intensity of that pixel in the image.

Images are generally two-dimensional arrays of pixels, and are conveniently described in terms of Cartesian coordinates, so that the position of a given pixel can be described by a pair of x-y coordinates. This representation is convenient when, for example, the image is to be displayed on a raster scan display since the x coordinate maps to the distance along a line of the display, and the y coordinate maps to the number of the line. The frame buffer 10 has sufficient memory capacity to store at least one image. For example, for an image having a resolution of 1000 by 1000 pixels, the frame buffer 10 includes $10^6$ pixel locations, each addressable directly or indirectly in terms of pixel coordinates x,y.

Coupled to the frame buffer 10 is a display unit 12 for displaying the image stored in the frame buffer 10 in a conventional manner. Also coupled to the frame buffer 10 is a video tape recorder (VTR) 14 or other image recording device, such as a paper printer or 35 mm film recorder.

Coupled to the memory 6 (typically via the CPU 4), and possibly also to the frame buffer 10, is a mass storage device 16, such as a hard disc drive, having a high data storage capacity. Also coupled to the memory 6 is a disc drive 18 which is operable to accept removable data storage media, such as a floppy disc 20, and to transfer data stored thereon to the memory 6.

The CPU 4, memory 6, frame buffer 10, display unit 12 and mass storage device 16 may be commercially available as a complete system, for example as an IBM-compatible personal computer (PC) or a workstation such as the SparcStation available from Sun Microsystems.

A number of embodiments of the invention can be supplied commercially in the form of programs stored on a floppy disc 20 or other medium, or signals transmitted over a data link, so that the receiving hardware becomes re-configured into an apparatus embodying the invention. As will be seen, the invention allows technically better performance to be achieved than was hitherto possible with a given type of computer hardware.

The overall operation of the apparatus will now be described.

Figure 2:
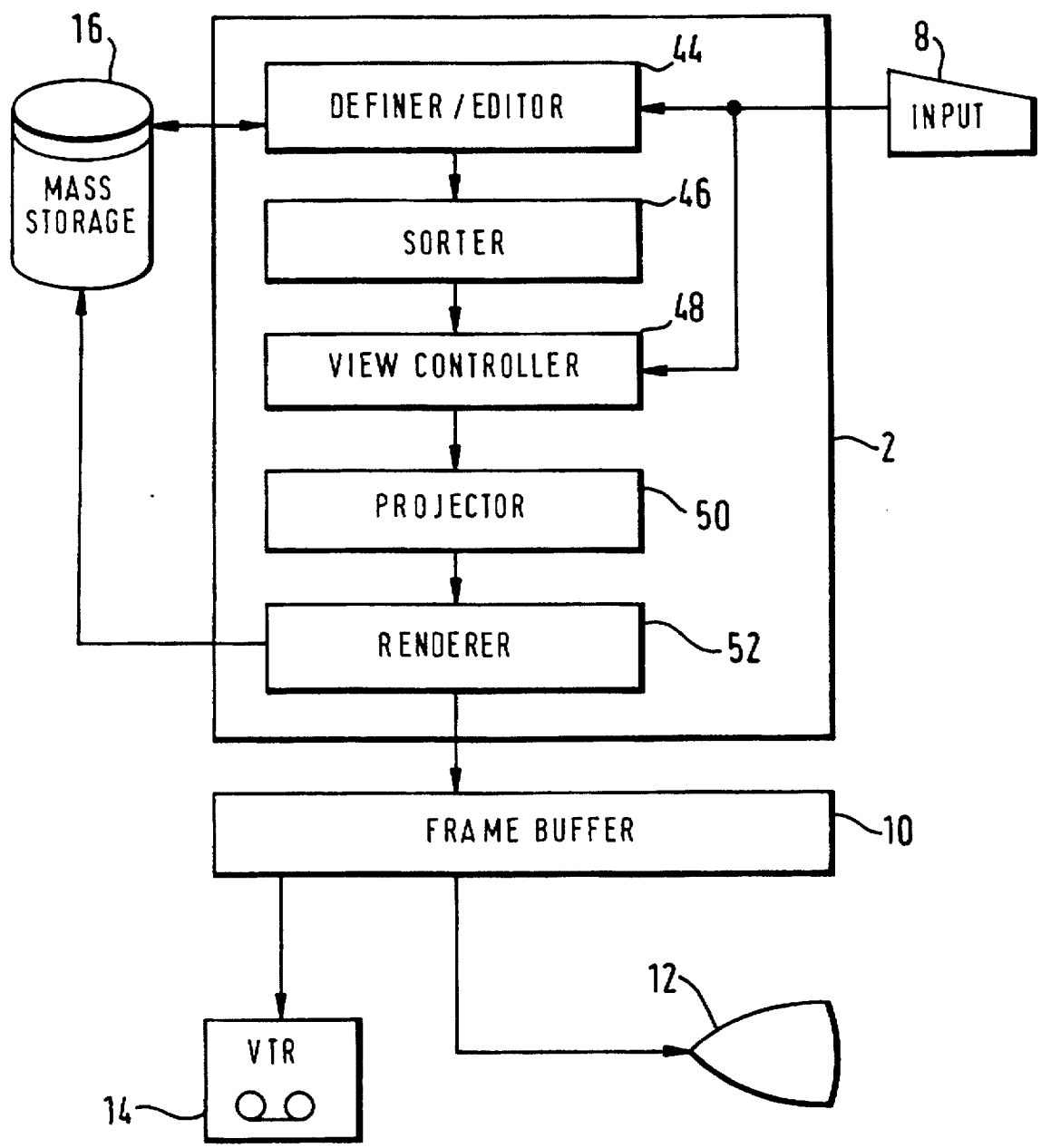
FIG. 2 schematically illustrates the operations performed by the computer in an embodiment of the invention.

With reference to FIG. 2, the computer 2 performs a number of different operations at different times, executing corresponding stored programs within the memory 6, and therefore comprises (together with the memory 6) means 44 to 52 for performing such operations. These means are illustratively shown in FIG. 2 as separate, although in some embodiments, all are performed by the CPU 4 in cooperation with the memory 6. It will be understood, however, that separate processors or dedicated logic circuits, operatively connected, could be provided to execute each function.

The arrangement may thus be considered as comprising, firstly, a definer or editor 44 arranged to define the shape of a two- or three-dimensional object and likewise, optionally, to edit the object. The definer/editor 44 is connected to the mass storage device 16 to enable an object, once defined, to be stored for subsequent use. The definer/editor 44 is also connected to the input device 8 to enable an operator to input and/or change the object. In the present embodiment, the data defining an object is data representing control points or vertices of a plurality of surfaces making up the object, which in embodiments are polygons. If a texture image is to be applied to the object, the definer/editor 44 is also used to assign a texture coordinate pair within the pre-stored texture image to each vertex of each polygon in the object.

Sorter 46 is provided for performing an initial operation of sorting the surfaces or regions of the object into an order which determines the order in which they will be drawn (i.e. rendered into the frame buffer 10) so as to draw last those regions which are intended to occlude others. The sorter 46 reads the object data defined by the definer/editor 44 and generates a corresponding sorted list of regions for subsequent use.

The appearance of the object on the two dimensional screen of the display unit 12, and consequently the image data stored in the frame buffer 10, is dependent upon the view direction from which the object is to be viewed. It may also be dependent upon the distance between the object and a notional viewpoint corresponding to the plane of the screen of the display unit 12. View controller 48 is therefore provided for enabling an operator to define a view direction, or a view direction and a distance (for example, by defining the coordinates of a viewpoint and/or view direction), via the input device 8. Rather than defining individual viewpoints one at a time, the input means 8 may be employed to define a trajectory of successive viewpoints or viewing directions, for example by specifying a direction of movement and speed.

Projector 50 is provided to perform a projection of each polygon within a given three dimensional object into the two dimensional viewing plane.

Each two dimensional viewing plane region projected by the projector 50 is then rendered, in the order previously defined by the sorter 46, by a renderer 52 which fills the region (that is, allocates an appropriate colour or grey scale value to each pixel location in the frame buffer 10 which lies within the region). In performing the rendering operation, the renderer 52 is arranged to test each region to determine which direction in the projected plane it is facing, since only regions which face outwardly of the object ("forward facing") need to be rendered. In addition, before writing the pixel values into the frame buffer 10, the renderer 52 performs texture mapping, as will now be described.

Figure 3:
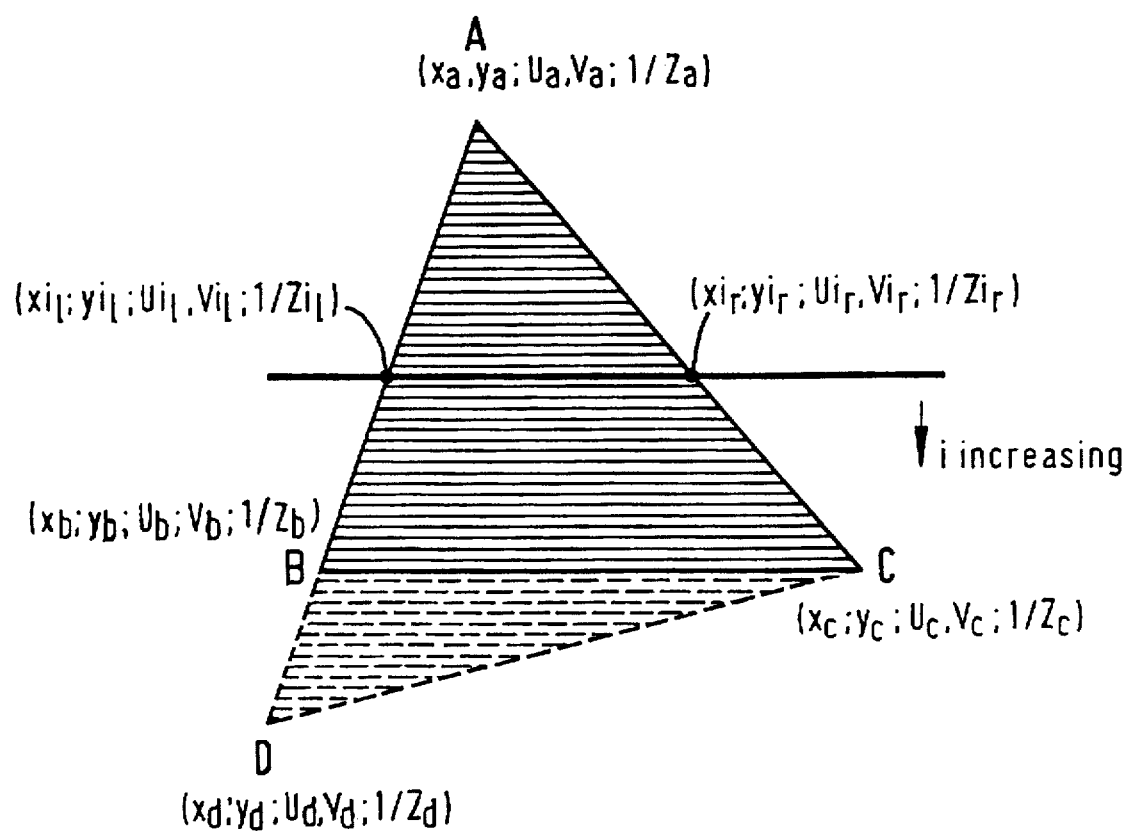
FIG. 3 schematically illustrates a triangular polygon to be rendered in the display image, and the data associated with each vertex of the polygon.

The renderer 52 receives data from the projector 50 defining each polygon in terms of its vertices, as illustrated in FIG. 3. For each vertex, the renderer 52 receives data defining the pixel position within the 2-D raster display, and a value defining the reciprocal of the depth of the vertex in eye space (commonly known in the art as a 1/Z value).

If a texture map is to be applied to the polygon, the renderer receives data defining the display pixel location of the vertex in terms of the x,y coordinates described previously, the texel location of the vertex in terms of the two quantised texture map coordinates (which will hereinafter be referred to as U and V) defined by the definer/editor 44, and the reciprocal of the depth of the vertex in eye space (1/Z). This is illustrated schematically in FIG. 3 for a polygon having vertices A, B and C (with the values associated with each vertex having the suffix a, b or c accordingly). In addition, the renderer 52 also receives data defining the x,y and z components of the polygon unit normal vector, which has unit length and is perpendicular to the plane of the polygon.

Before describing embodiments of the renderer 52, a description of the theory behind the embodiments will be given to assist understanding.

As explained above, for correct perspective, the values of each texture coordinate U, V vary hyperbolically in relation to linear changes in display pixel position. Accordingly, U and V vary with the pixel position along a scan line as follows:

$$t(p) = \frac{t_l Z_r (s-p) + t_r Z_l p}{Z_r(s-p) + Z_l p}$$

$$\rightarrow t(p) = \frac{t_l Z_r s + (Z_l t_r - t_l Z_r)p}{sZ_r + (Z_l - Z_r)p}$$

where t is a texture coordinate (that is either U or V) varying from $t_l$ at one side of the span (left) to be rendered to $t_r$ at the other side (right), Z is the depth value varying from $Z_l$ to $Z_r$ across the span, and p is the pixel position along the scan line varying from 0 at the start pixel of the span to "s" at the end pixel of the span.

Figure 4:
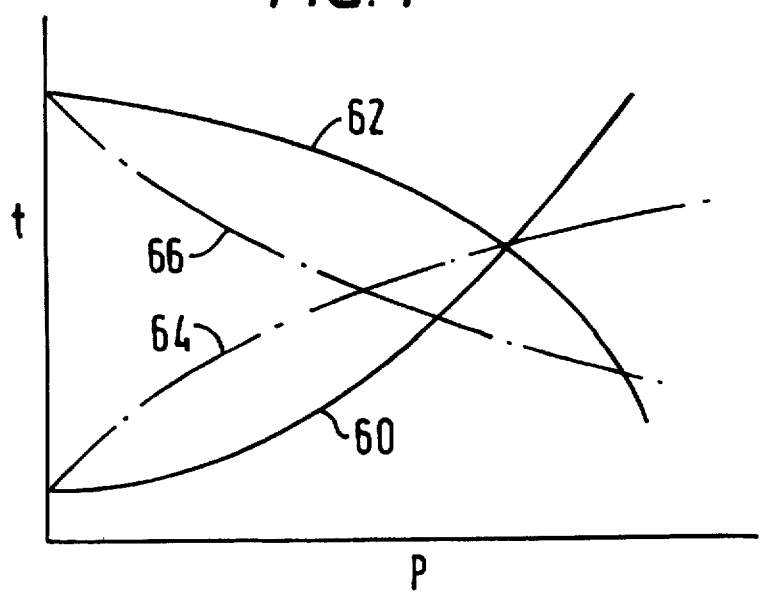
FIG. 4 illustrates the four different classes of hyperbolae which can be taken by each texture coordinate parameter in an embodiment of the invention.

FIG. 4 illustrates how the value of t can vary with pixel position p in accordance with this hyperbolic relationship.

Hyperbolae 60 and 64 illustrate the cases where t increases as the pixel position varies linearly across the span, while hyperbolae 62 and 66 illustrate the cases where t decreases with increasing p. Of these four cases, hyperbolae 60 and 62 shown by solid lines define the case where t changes more rapidly as p increases (since the slopes of these hyperbolae increase as p increases). Hyperbolae 64 and 66 shown in chain lines in FIG. 4 define the opposite case, that is where the value of t decrease more slowly as p increases (since the slopes of these hyperbolae decrease as p increases).

Figure 5A:
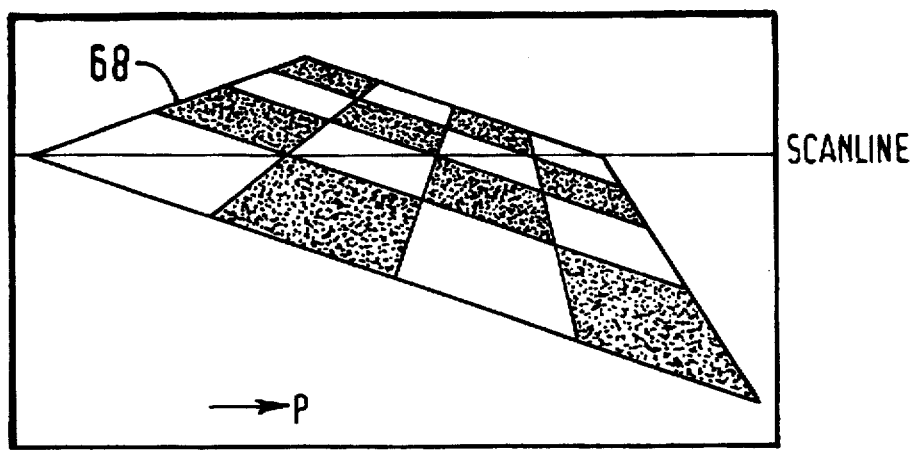
FIG. 5a illustrates a polygon rendered with a checkerboard pattern in accordance with hyperbolae 60, 62 in FIG. 4.

FIG. 5a shows an example where stored texture may define a simple checkerboard pattern for the case represented by hyperbolae 60 and 62. In this case, t increases more rapidly with increasing p, and the checkerboard 68 has a left edge which is closer to the viewer than the right edge. As p increases along the horizontal scan line on the screen from left to right, the squares on the checkerboard, which correspond to t, become closer together on the screen.

Figure 5B:
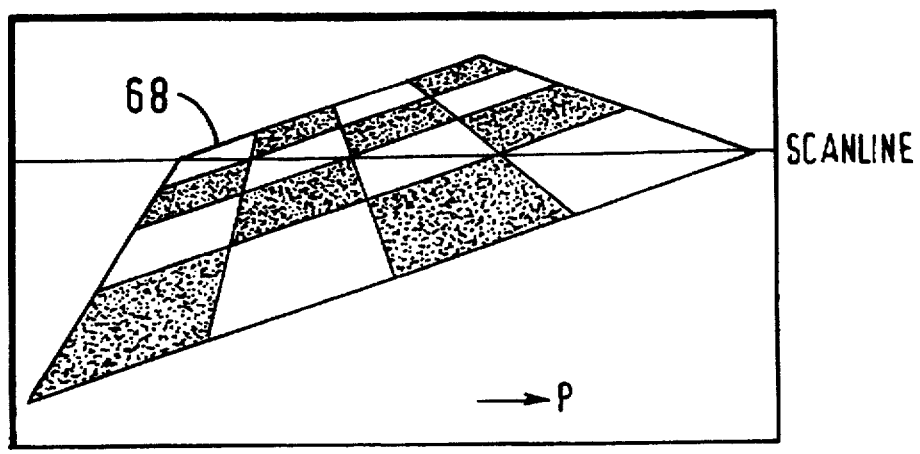
FIG. 5b illustrates a polygon rendered with a checkerboard pattern in accordance with hyperbolae 62, 64 in FIG. 4.

FIG. 5b shows an example of the case represented by hyperbolae 64 and 66, namely the case where the value of t decreases for increases in p. In this case, the orientation of the checkerboard 68 is reversed compared to that in FIG. 5a, having a left edge which is further from the viewer than the right edge. As p increases from left to right, the squares on the checkerboard become wider on the screen.

Referring again to the hyperbolic equation for t(p), the inventor has recognised that, having obtained an initial value for t(p), it is advantageous to calculate the value of t(p+1), that is the value of U or V at the next pixel position along the scan line, incrementally by adding the value of the differential to the initial value. This differential value ($\Delta t$) corresponds to the change in U or V for a unit change in p. This advantage will now be explained.

Differentiating the hyperbolic equation gives:

$$\Delta t = \frac{dt}{dp} = \frac{(t_r Z_l - t_l Z_r)Z_r s - t_l Z_r s (Z_l - Z_r)}{[Z_r s + (Z_l - Z_r)p]^2}$$

$$\rightarrow \frac{dt}{dp} = \frac{BC - AD}{(C + Dp)^2}$$

where $A = t_l Z_r S$ $B = t_r Z_l - t_l Z_r$ $C = Z_r S$ $D = (Z_l - Z_r)$

Because the hyperbola t(p) is not a linear function of p, the differential $\Delta t$ is not constant, and has to be evaluated for each pixel of the span. This also requires a division to be performed per pixel, so the problem present in the prior art apparently remains. However, the inventor has observed that the numerator of the differential is a constant over the span. That is, it does not depend on pixel position p, but does depend upon the values of the texture coordinate t (i.e. U or V), and the depth values, at the start and end of the span of pixels.

The inventor has further observed that, while the denominator of the differential is a function of p (and the depth values at the start and end of the span), it is independent of t. As only the denominator of the differential is a function of p, it is only necessary to evaluate the denominator for each new value of p, and not the numerator. Al so, the denominator of the differential is common to both U and V, since it depends only on the depth values ($Z_l, Z_r$) and pixel position, and hence needs to be evaluated only once to derive values for both U and V at a given pixel.

As noted previously, the numerator of the differential $\Delta t$ is not a function of p and accordingly, for each line of pixels, the numerator needs to be evaluated only once for U and once for V using the values of U and V at the start pixel and the end pixel on the line.

Evaluation of the denominator can be done by tracking the value of the denominator incrementally across the span, adding the value of the differential of the denominator to the previous value of the denominator itself to give the next value of the denominator.

Differentiating the denominator, denoted by Dnom, gives:

$$\Delta Dnom = 2(Z_1-Z_r)^2 p + 2(Z_1-Z_r) Z_r s$$

As will be seen, the differential of the denominator is also a function of p, and accordingly will change in value as the pixel position across the span changes. The differential $\Delta Dnom$ can also be tracked incrementally, however, and the new value can be obtained by adding the second differential of the denominator, given by:

$$\Delta\Delta Dnom = 2(Z_1-Z_r)^2$$

This second differential is not a function of p and accordingly is constant across the span of pixels. It does not therefore need to be calculated for each pixel, since the same, constant value can be added to the first differential $\Delta Dnom$ for each pixel in the span to give the updated value of the first differential.

As a further point, it may be noted from FIG. 3 that, rather than the actual Z (depth) values, the reciprocal 1/Z is commonly used instead in 3D computer graphics systems. In the following description, the symbols $R_1$ and $R_r$ will be used to represent $1/Z_1$ and $1/Z_r$ respectively. In fact, all of the above hyperbolic equations and their differentials can be modified simply to use the R values instead of Z values, because it is only the ratio of $Z_1$ and $Z_r$ that affects the shape of the hyperbolic curve. In each equation, it is necessary only to substitute $R_1$ for $Z_r$, and $R_r$ for $Z_1$.

Figure 6:
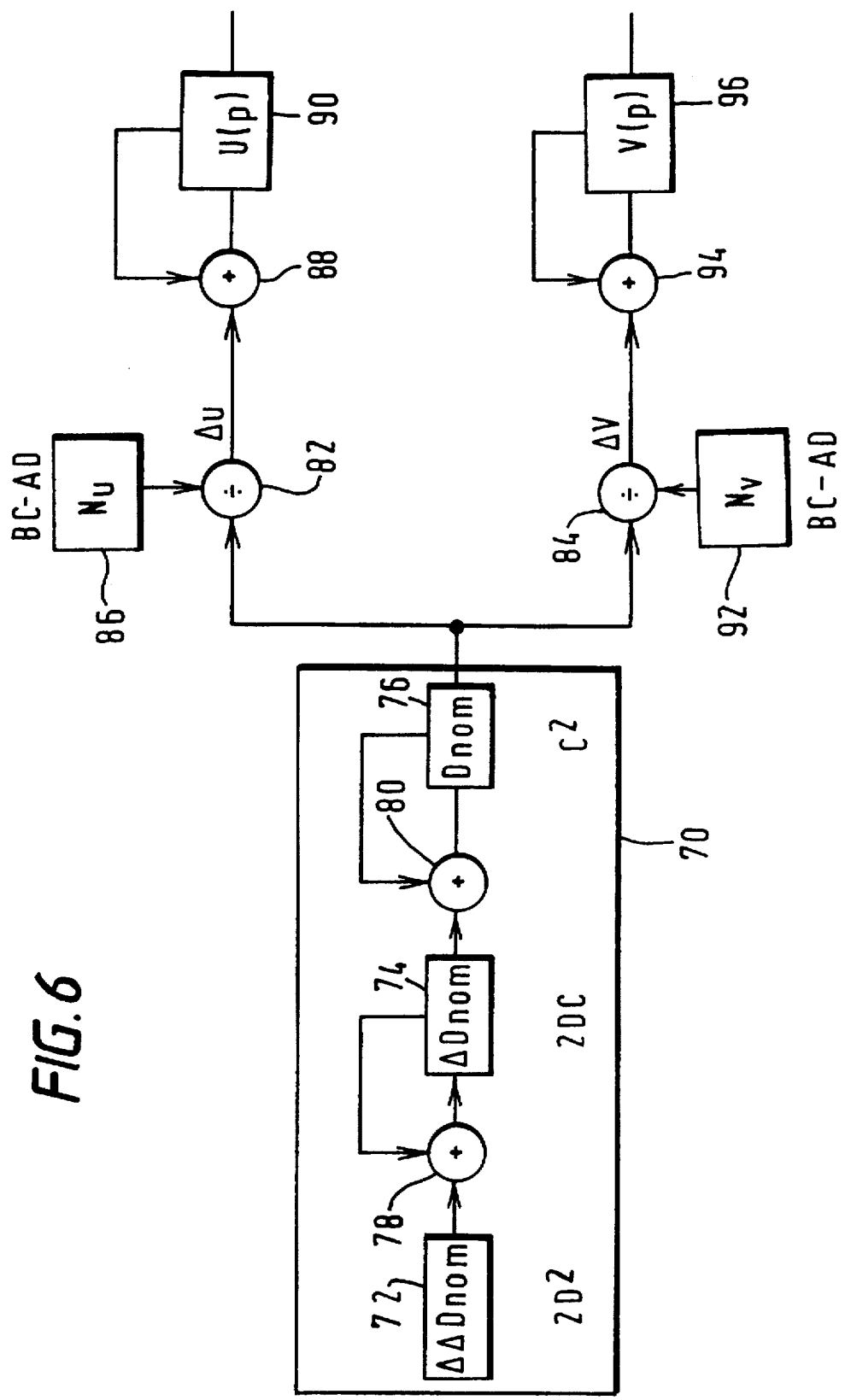
FIG. 6 illustrates an embodiment of renderer 52.

FIG. 6 shows a first arrangement for performing the above-described technique in the system described previously. This schematic arrangement can be implemented readily by the skilled person by dedicated hardware, or by programming a general purpose or specialised microprocessor.

In the FIG. 6 arrangement, block 70 evaluates the denominator Dnom. In this block 70, register 72 stores the constant value of the second derivative of the denominator $\Delta\Delta Dnom$. Register 74 is loaded at the start of operation with the value of the first differential of the denominator $\Delta Dnom$, and register 76 is loaded with the value of the denominator itself.

In operation, the value of the second derivative from register 72 and the value of the first derivative from register 74 are added at 78 and clocked into register 74 as the new value of the first derivative. Simultaneously with this operation, the value of the first derivative in register 74 and the value of the denominator itself in register 76 are added at 80 and clocked into register 76 as the new value of the denominator.

For each pixel, at 82, the value of the numerator evaluated for texture parameter U, which has previously been stored in register 86 as a constant value for the span of pixels, is divided by the value of the denominator from register 76. The result of the division at 82 represents the derivative $\Delta U$, which is then added at 88 to a previous value of U stored in register 90. The result of the addition at 88 represents an updated version of U which is output and also stored in register 90.

Similarly, for each pixel, the value of the numerator evaluated for V, which has previously been stored in register 92, is divided at 84 by the value of the denominator from register 76 to give a value for $\Delta V$. The result of the division at 84 is added at 94 to a previous value of V stored in register 96. The result of the addition at 94 represents an updated value of V which is output and also stored in register 96.

In the arrangement of FIG. 6, knowing the value of the numerator and the denominator of the differential $\Delta t$, it is still necessary to divide the two numerators by the denominator to give the value of the differential. Although at first sight two divisions are necessary per pixel just as in the prior art which evaluates t(p) directly, the inventor has recognised that evaluating the derivatives of U and V as described above permits the divisions to be implemented quickly, even when using only a conventional microprocessor, as will now be described.

Before describing a complete method to be performed by the microprocessor, some further theory will be given. Taking the logarithm to base 2 on both sides of the equation for first derivative $\Delta t$ gives:

$$\log_2(\Delta t) = \log_2\left(\frac{NUM}{Dnom}\right)$$

where Num represents the numerator and Dnom represents denominator.

This can be written as:

$$\Delta t = 2^{\log_2(Num) - \log_2(Dnom)} \rightarrow \Delta t = \text{antilog}_2(\text{constant} - \log_2(Dnom))$$

where "constant" represents $\log_2(Num)$.

Whatever its value, the denominator of $\Delta t$ can be represented as a binary "floating point" number, which is essentially of the form:

$$Dnom = m \times 2^e$$

where m is called the "mantissa" of the number and e is called the "exponent" of the number to base 2. ANSI/IEEE standard 754-1985, described in "The Art of Electronics" by P. Horowitz and W. Hill, Cambridge University Press, Second Edition, ISBN 0-521-37095-7, is a common standard representation in which 32 bits are used to represent the floating point number, in the format shown in FIG. 7a. Here, the 23 least significant bits represent the fractional part of the mantissa, the next eight bits represent the exponent, and the most significant bit represents the sign of the number (that is positive or negative). The integer part of the mantissa is always assumed to be '1'. Exponents from −126 to +127 can be represented.

Figure 7A:
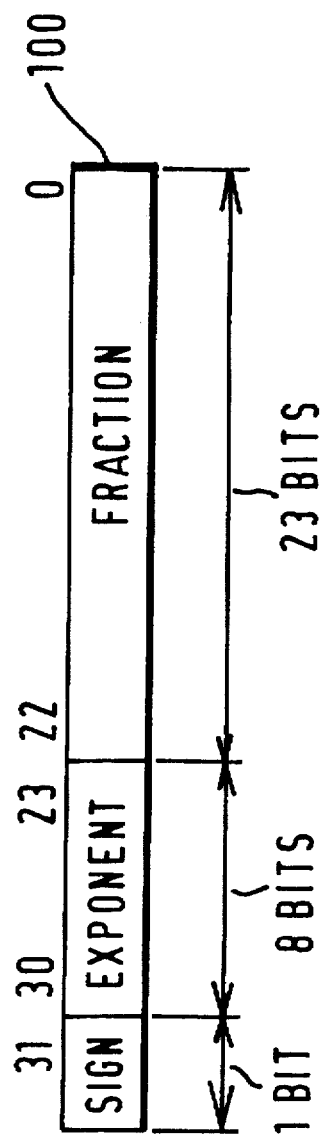
FIG. 7a and FIG. 7b illustrate the storage of numbers within registers in an embodiment of the invention.
Figure 7B:
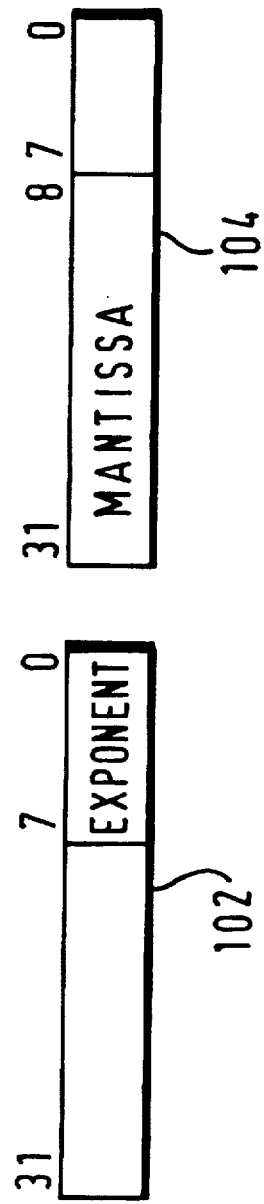

In addition to the IEEE format, other formats are possible, and also the exponent and mantissa can be represented in entirely separate registers, for example as shown in FIG. 7b. In this representation, the integer bit of the mantissa, always equal to '1', is explicitly written in the MSB (bit 31) of the 32-bit register 104. The bits 30 down to 8 correspond to bits 22 down to 0 in the IEEE representation of FIG. 7a. In the case of the denominator, the exponent will always be positive ($1/Z_1$ and $1/Z_r$ being regarded as integers) and hence it is not necessary to store the sign of the exponent. Numbers received in binary fixed point format can also be converted simply to the mantissa and exponent form.

Taking logs of this number representation gives:

$$\log_2(Dnom) = e + \log_2(m)$$

This equation is used to evaluate the log of the denominator of $\Delta t$ in embodiments of the invention, as will be described below.

As further background, any number, say a, can be represented by an integer (int) and a fraction (frac), as follows:

a = int + frac

Taking antilogs to the base 2:

$$\text{antilog}(a) = 2^{(int+frac)} = 2^{int} \times 2^{frac}$$

$2^{int}$ can be implemented by a shift in a hardware register to the left or right (depending on the sign of int) by int places.

The complete process implemented by the renderer 52 employing the above theory will now be described.

FIG. 8 shows the steps performed by render 52 to carry out the texture mapping process to determine values for each pixel within the polygon to be rendered. The renderer 52 has stored previously tables of logarithms and antilogarithms for use in implementing the method. These will be described in more detail later, particularly with reference to FIGS. 11a and 11b.

At step 120, the renderer 52 reads the data described above with respect to FIG. 3 for each vertex of the polygon and a unit vector normal to the polygon. Each of the values read may be in floating point format as described above with respect to FIG. 7a, but in the present apparatus they are assumed to be in a fixed point format.

At step 122, the data defining the unit vector normal to the polygon is used to determine whether the polygon is facing left with respect to the viewer, in which case the x component of the unit normal will have a negative value, or whether it is facing right with respect to the viewer, in which case the unit normal will have a positive x component. This single test distinguishes the situation of FIG. 5a (x component positive) from that of FIG. 5b (x component negative).

At step 124, the data read at step 120 is used to calculate the following "delta" values (gradient or slope with respect to y) for the left and right edges of the polygon:

$$\Delta x_l = \frac{x_b - x_a}{y_b - y_a}$$

$$\Delta x_r = \frac{x_c - x_a}{y_c - y_a}$$

where, $\Delta x_l$, is the delta value for the left edge of the polygon shown in FIG. 3, $\Delta x_r$ is the delta value for the right edge of the polygon, x is the pixel position for a vertex along a given scan line, and y is the number of the scan line on which the vertex lies.

In step 126, the values of $\Delta x_l$ and $\Delta x_r$ are used to determine the start and end pixels of the scan line to be rendered. The y coordinate of the start and end pixels is given by the number of scan line (that is, $yi_l=yi_r=y_a+i$, where i is the number of the scan line running from 0 at the scan line containing vertex A to $y_b-y_a$ at the scan line containing vertex B; see FIG. 3), while the x coordinates are given by:

$$xi_l=x_a+i\Delta x_l$$

$$xi_r=x_a+i\Delta x_r$$

where, $xi_l$ is the x coordinate of the start (left) pixel and $xi_r$ is the x coordinate of the end (right) pixel.

In practice, the scan lines are dealt with sequentially, so that the values of $xi_l$ and $xi_r$ are determined for each line simply by incrementing the previous value $(x(i-1)_l$ or $x(i-1)_r)$ by $\Delta x_l$ or $\Delta x_r$ as appropriate.

In step 128, the renderer 52 determines the U, V and 1/Z values for the start and end pixels determined at step 124. Since 1/Z varies linearly along the edges of the polygon between vertices, its value at the start and end pixels is determined from the vertex data read at step 120 using the following linear equations:

$$Ri_l = R_a + i\Delta R_l = R_a + i\left[\frac{R_b - R_a}{y_b - y_a}\right]$$

-continued
$$Ri_r = R_a + i\Delta R_r = R_a + i\left[\frac{R_c - R_a}{y_c - y_a}\right]$$

where $Ri_l$ is the 1/Z value at the start pixel on the ith scan line, $Ri_r$ is the 1/Z value at the end pixel on the ith scan line, $R_a=1/Z_a$, and $R_b=1/Z_b$. Again, these linear equations are calculated incrementally by adding the $\Delta R$ value to the R value for the previous scan line.

As is known to persons skilled in the art, for example from the Blinn reference above, the values of U and V should vary hyperbolically along the edges of the polygon between the vertices for correct perspective. Accordingly, the U and V values for the start and end pixels on the given scan line are calculated in this embodiment using the following hyperbolic equations:

$$Ui_l = \frac{R_a U_a(1 - q_l) + q_l R_b U_b}{R_a(1 - q_l) + q_l R_b}$$

$$Ui_r = \frac{R_a U_a(1 - q_r) + q_r R_c U_c}{R_a(1 - q_r) + q_r R_c}$$

$$Vi_l = \frac{R_a V_a(1 - q_l) + q_l R_b V_b}{R_a(1 - q_l) + q_l R_b}$$

$$Vi_r = \frac{R_a V_a(1 - q_r) + q_r R_c V_c}{R_a(1 - q_r) + q_r R_c}$$

where $Ui_l$ is the U value at the start pixel, $Ui_r$ is the U value at the end pixel, $Vi_l$ is the V value at start pixel, $Vi_r$ is the V value at the end pixel, $R_a$ and $R_b$ are as defined above, and $q_l$ and $q_r$ are variables which vary linearly between 0 and 1 in accordance with the distance of the pixel along the left and right edges respectively of the polygon between the vertices, $q_l$ and $q_r$ therefore being given by the following equations:

$$q_l = \frac{i}{y_b - y_a}$$

$$q_r = \frac{i}{y_c - y_a}$$

Referring again to FIG. 8, at step 130, the renderer 52 calculates the values of each pixel along the scan line from the start pixel to the end pixel using the values calculated in step 128. The values are stored, for example in the frame buffer 10, and plotted on display 12. The manner in which step 130 is performed is described below.

At step 132, a check is made as to whether the scan line just processed is the last scan line within the polygon. If it is not, steps 126 to 132 are repeated until all the scan lines have been processed. The rendering of the polygon is then complete, and the process for that particular polygon ends at step 134, although of course it will be appreciated that the whole of the process shown in FIG. 8 can subsequently be repeated for other polygons. If the triangle to be rendered is triangle ADC shown in FIG. 3, then the triangle may be split at vertex C (that is, the middle vertex in the vertical direction) so that triangles ABC and BDC are rendered separately, in the conventional manner.

The way in which the renderer 52 performs step 130 in FIG. 8 will now be described with reference to FIGS. 9 to 17.

Figure 9:
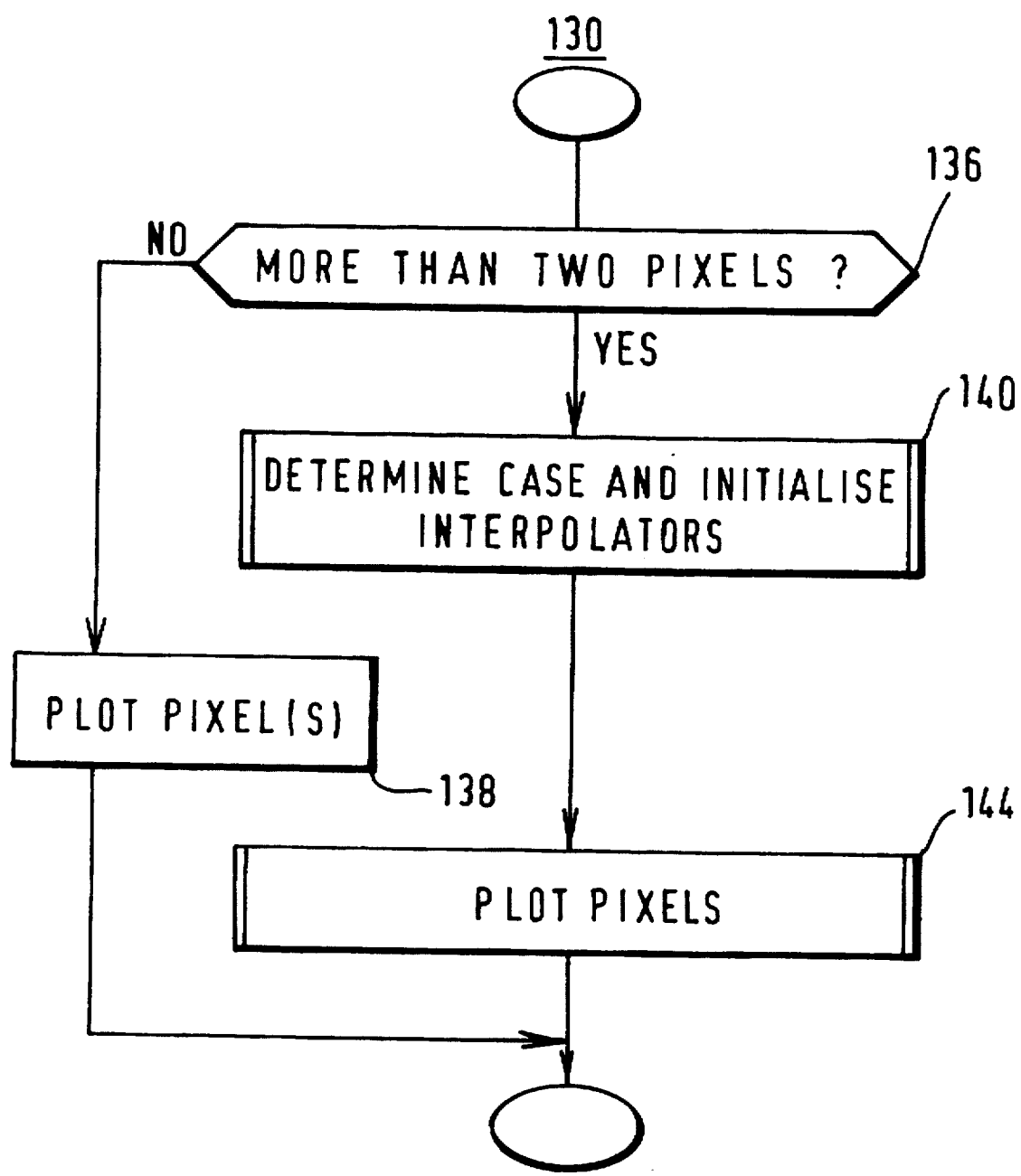
FIG. 9 shows the steps performed in step 130 of FIG. 8.

Referring to FIG. 9, the renderer 52 first checks at step 136 to ensure that the span has more than two pixels to be plotted. If the span is only one or two pixels wide, these are plotted directly at step 138, using the start and end values of U and V determined at step 128, without the need for hyperbolic interpolation. The flow then passes to step 132 (FIG. 8), and another span.

On the other hand, if it is determined at step 136 that there are more than two pixels in the span, at step 140 renderer 52 initialises the set of interpolators that will be used in calculating the pixel values, and determines which of the hyperbolic cases described above with respect to FIG. 4 is applicable to the polygon, as will be described in more detail below. Renderer 52 then plots the pixels at step 144.

Figure 10:
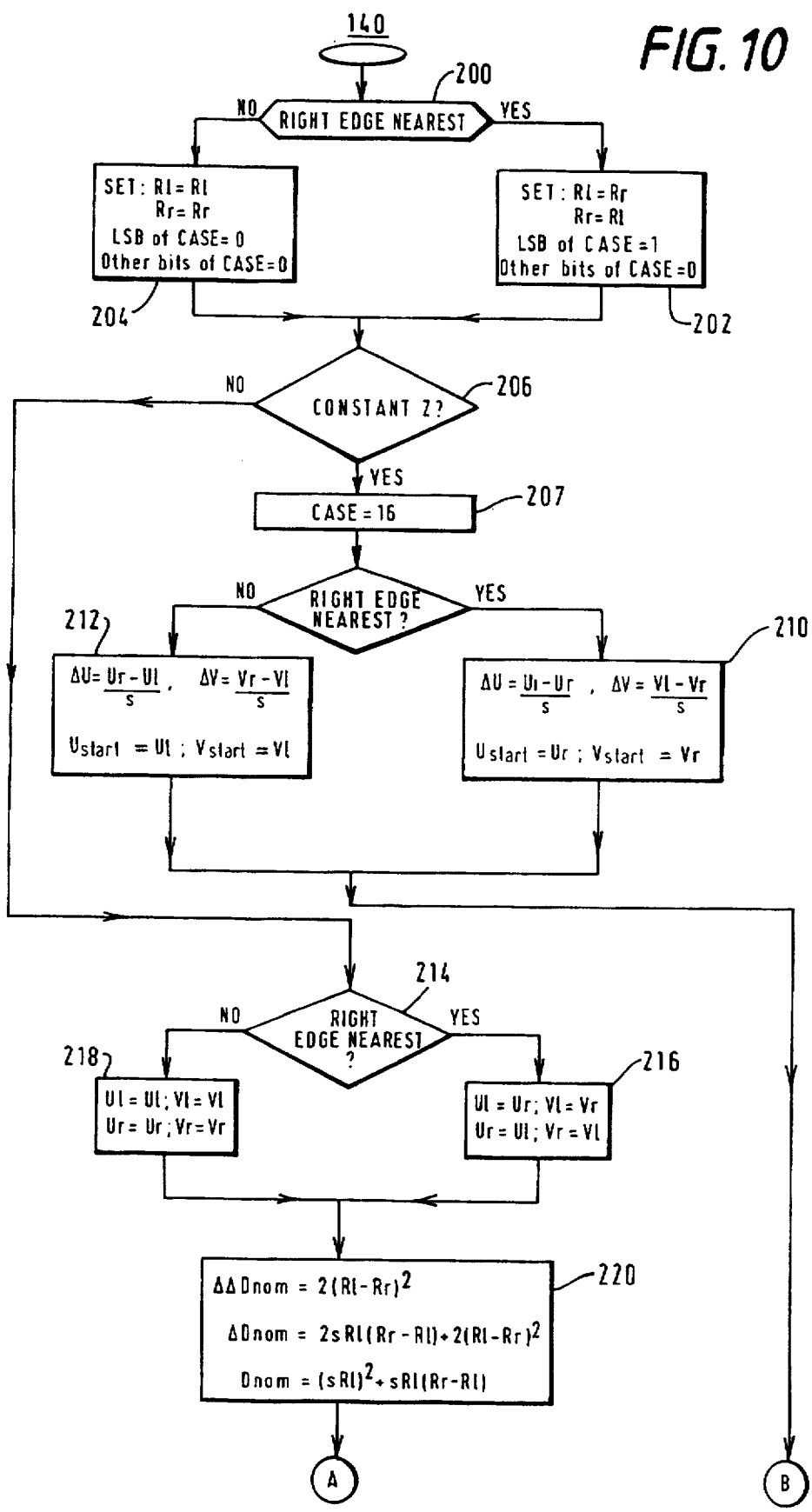
FIG. 10, 10(CONT.) AND 10 (CONT.) shows the steps performed in step 140 of FIG. 9.
Figure 10:
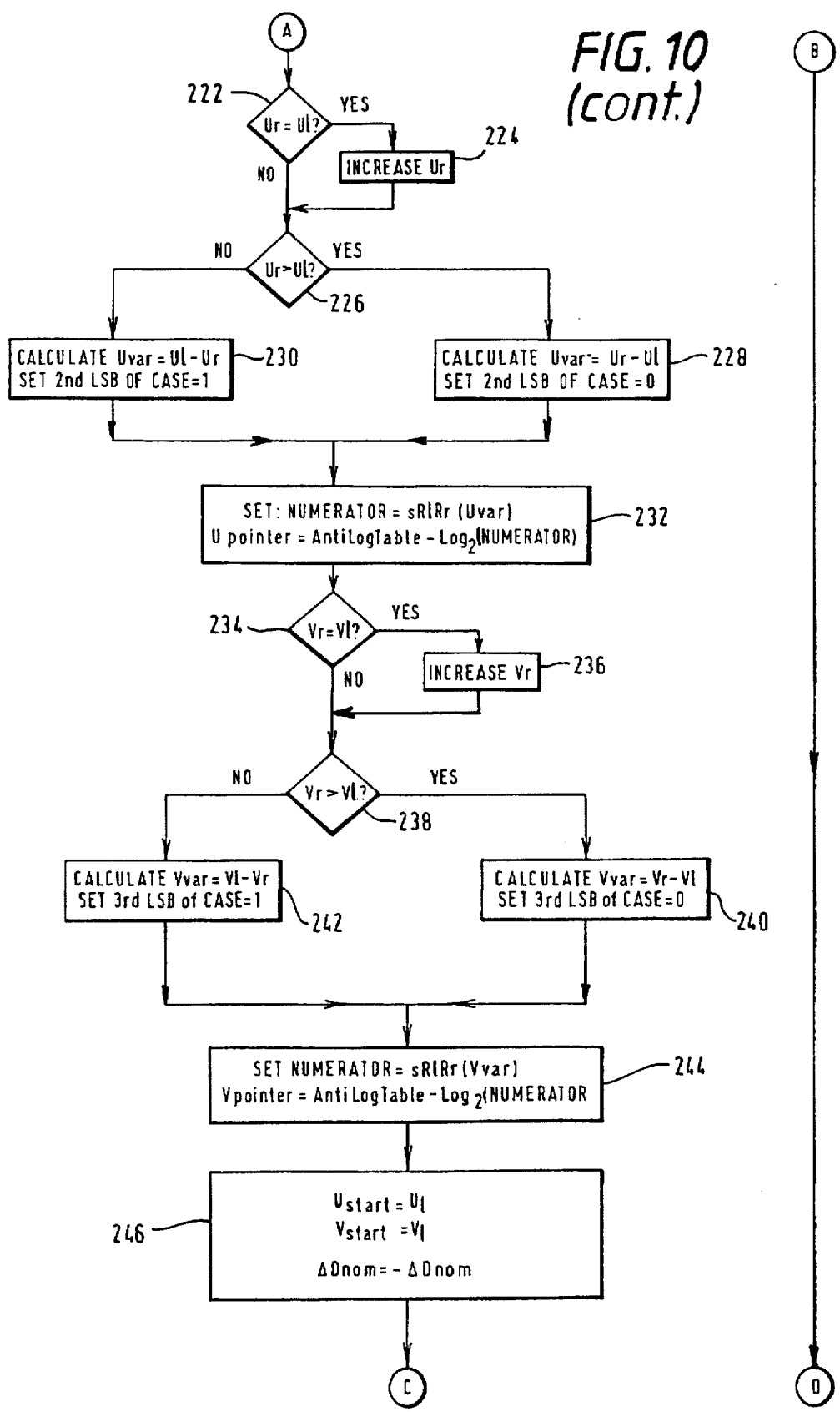
Figure 10:
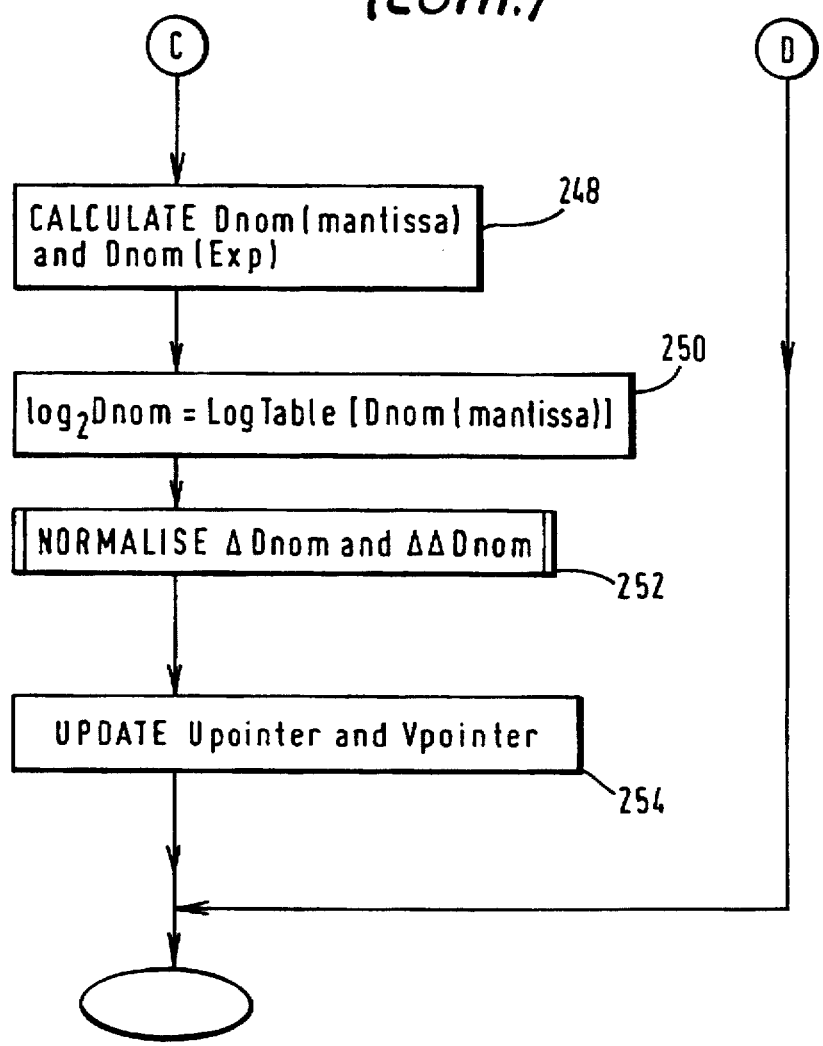

FIG. 10 shows the steps performed by renderer 52 in initialising the interpolators and determining the case at step 140 shown in FIG. 9.

At step 200, the renderer 52 determines whether the right edge of the polygon is deemed closer to the viewer than the left edge, that is whether the polygon corresponds to a case represented by the hyperbolae 64 and 66 in FIG. 4. This determination is performed by reading the x component of the polygon unit normal which was read at step 120 shown in FIG. 8; if the x component is negative, the right edge is deemed nearer than the left edge. The result of this test has consequences for the way in which the polygon will be rendered in the present apparatus. More particularly, the polygon will be rendered so that errors which accumulate during the incremental calculations of U and V will be less visible. Conventionally, pixels are rendered from left to right (increasing x) across the screen. In the case discussed above with respect to FIG. 5a, because the large texels are drawn first, moving to the smaller texels on the right edge of the screen, errors accumulated in calculating the texel values across the span when rendering from left to right will be less noticeable. However, in the case shown in FIG. 5b, errors accumulated across the span from left to right would be more visible since the texels at the right edge of the screen are larger than those at the left. In the present apparatus, this problem is addressed by selecting the direction in which rendering is performed in dependence upon whether the polygon corresponds to that shown in FIG. 5a or FIG. 5b. Rendering is performed from the edge deemed nearer to the viewer to the edge deemed further away, for example from right to left, if the right edge of the polygon is deemed nearer to the viewer than the left edge.

Therefore, if the x component of the normal is negative, then the right edge of the polygon is deemed to be nearer to the viewer than the left edge, and the renderer performs step 202 in which the least significant bit of a register designated "CASE" is set to 1 and the other bits of the register are set to 0. In addition, at step 202 renderer 52 interchanges the values of 1/Z (R) for the pixels at the start of the span and the end of the span (to accommodate scanning from right to left). That is, $R_l$ becomes $R_r$, and $R_r$ becomes $R_l$.

If at step 200 the renderer 52 determines that the left edge of the polygon is deemed nearer, then at step 204 it sets the least significant bit of register CASE equal to 0 and sets the other bits in CASE also equal to 0. In this case, however, the values of $R_l$ and $R_r$ are not interchanged.

At step 206 renderer 52 tests to determine whether:

$R_r - R_l > 0$ OR $R_l \cong R_r$

Since $R_l$ and $R_r$ have been interchanged if necessary at step 202, $R_r$ should never as a rule exceed $R_l$. The first test thus traps unusual cases in which the difference between $R_l$ and $R_r$ is very small and rounding errors may have caused this rule to be broken for a given span. The second test above is performed by shifting the values of $R_l$ and $R_r$ by 22 places to the right in the registers in which they are stored in fixed point form, before comparing them. In this way, minor discrepancies in the values of $R_l$ and $R_r$ represented by the bits of lower significance in the original form of the number are ignored.

If either of the tests in step 206 proves true, renderer 52 determines that the polygon to be rendered is effectively lying in a plane of constant depth in viewing space. In this case, the process proceeds to step 207 at which the value of the bits in register CASE are set equal to 16 (which will be used to designate a constant Z case).

At step 208 renderer 52 again checks whether the right edge of the polygon is deemed nearer to the viewer than the left edge. This is performed by reading the x component of the polygon unit normal in the same manner as in step 200 described above.

If the right edge is deemed nearer than the left edge, then at step 210 renderer 52 sets the following values for $\Delta U$, $\Delta V$, $U_{start}$ and $V_{start}$:

$$\Delta U = \frac{U_l - U_r}{s}$$

$$\Delta V = \frac{V_l - V_r}{s}$$

$$U_{start} = U_r$$

$$V_{start} = V_r$$

where s is the length of the span of pixels defined earlier.

On the other hand, if it is determined at step 208 that the left edge is deemed nearer than the right edge, the renderer 52 sets the following values for $\Delta U$, $\Delta V$, $U_{start}$ and $V_{start}$ at step 212:

$$\Delta U = \frac{U_r - U_l}{s}$$

$$\Delta V = \frac{V_r - V_l}{s}$$

$$U_{start} = U_l$$

$$V_{start} = V_l$$

Having set the values in step 210 or in step 212, the process of initialisation and case determination is complete, and the renderer 52 proceeds to step 144 in FIG. 9.

Returning to step 206, if neither of the tests performed proves true, the renderer 52 proceeds to step 214, in which it again determines whether the right edge is deemed nearer than the left edge in the same manner as in step 200 described above.

If it is determined in step 214 that the right edge is deemed nearer, then at step 216 the values of $U_l$ and $U_r$ are interchanged, and the values of $V_l$ and $V_r$ are interchanged. On the other hand, if it is determined at step 214 that the left hand edge is deemed nearer than the right hand edge, these values are not interchanged, as illustrated in step 218.

At step 220, renderer 52 sets the following variables: $\Delta\Delta Dnom = 2(R_l - R_r)^2$ $\Delta Dnom = 2DC + \Delta\Delta Dnom = 2sR_l(R_r - R_l) + 2(R_l - R_r)^2$ $$Dnom = C^2 + \frac{1}{2} \cdot 2DC = (sR_l)^2 + sR_l(R_r - R_l)$$

These values correspond effectively to the values of Dnom, $\Delta$Dnom and $\Delta\Delta$Dnom derived above, with the value of p set equal to zero (this corresponding to the first pixel of the span). However, the initial value of $\Delta$Dnom is stored with the initial value of $\Delta\Delta$Dnom already in it, and the value of Dnom is stored with half the initial value of $\Delta$Dnom in it, so that the values are ready for use in plotting the first pixel.

It will be noted that some terms are common to two or more of Dnom, ΔDnom and ΔΔDnom, and hence can often be re-used in the calculations, decreasing the time required to perform step 220.

In an embodiment where floating point arithmetic can be quickly done, it is preferred to calculate the values in step 220 in floating point form, for ease of calculating logarithms later, even though the values of s, $R_1$, and $R_r$ are received by the renderer 52 in fixed point form.

At step 222, it is determined whether $U_r=U_1$. If this is the case, at step 224, $U_r$ is increased slightly (in order to prevent the differential being zero). At step 226 it is determined whether $U_r$ is greater than $U_1$ (that is, whether U is represented by a hyperbola 60/64 rather than a hyperbola 62/66 in FIG. 4), and if it is, at step 228 renderer 52 sets the second least significant bit of register CASE to 0, and sets the following variable:

$U_{var}=U_r-U_1$

On the other hand, it is determined in the step 226 that $U_r$ is not greater than $U_1$ (hyperbola 62 or 66), than at step 230 renderer 52 sets the second least significant bit of register CASE equal to 1 and sets the following variable:

$U_{var}=U_1-U_r$

At step 232, renderer 52 sets the following values:

$NUMERATOR=sR_1R_r(U_{var})$ $Upointer=AntiLogTable-[256\times log_2(NUMERATOR)]$ As described above, the differential Δt is given by:

$\Delta t=antilog\ [constant-log_2(Dnom)]$

In the present embodiment, Upointer is set at step 232 to give the address of the stored antilog table and the point within that table of log(NUMERATOR). In practice, the values in the antilog table are stored in reverse order, and the value of log(NUMERATOR) is therefore subtracted from the address (AntilogTable) of the base (centre) of the table. This enables values of $log_2$(Dnom) to be added to, rather than subtracted from, the pointer, which in turn allows rapid look-up of the antilog value using the "effective address" calculation facilities of a typical microprocessor. These operations will be explained in more detail below, with reference to FIGS. 16 and 17.

Figure 11A:
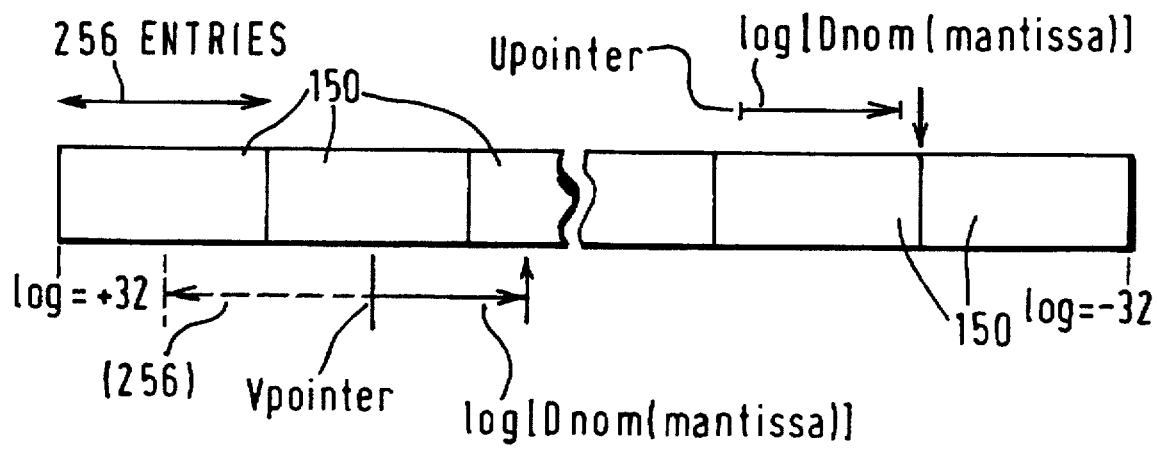
FIG. 11a and FIG. 11b illustrate the antilog tables stored in an embodiment of the invention.
Figure 11B:
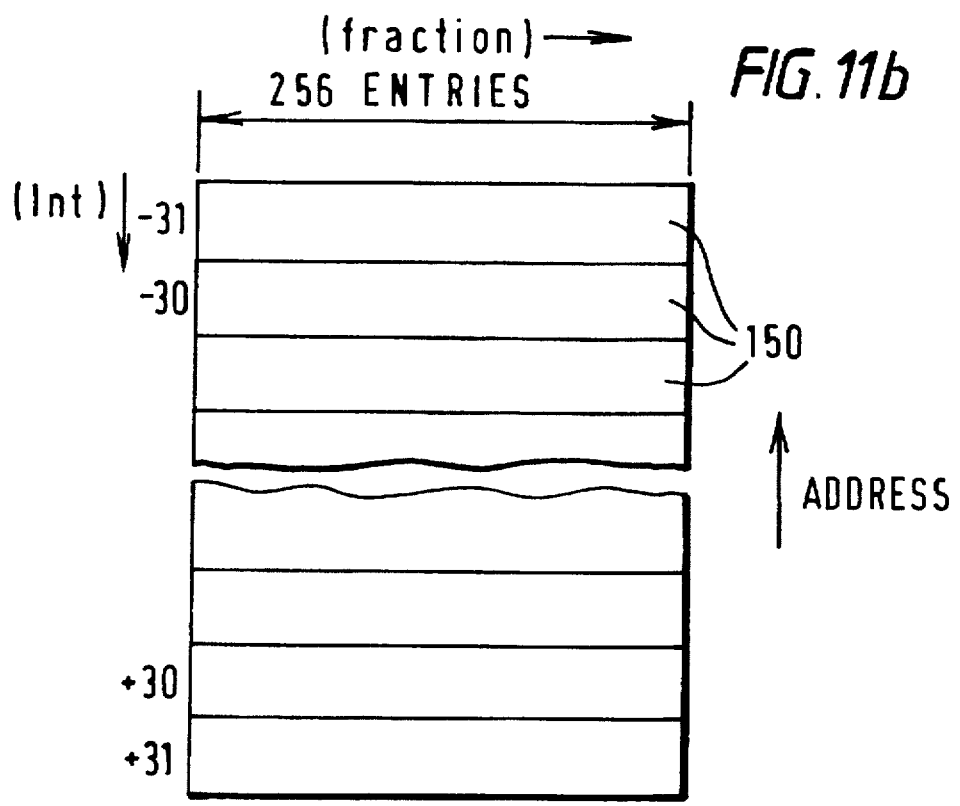

FIG. 11a shows the range of antilog tables that are stored in the present embodiment. Each table stores antilogs for the same range of fractional part of a number but with different integer parts, so as to make one large table, spanning the range of log values from +32 to −32, in order of ascending memory address. This is illustrated schematically in FIG. 11b, in which the antilog table to be used is chosen in dependence on the integer (int), and the actual value in the table is chosen in dependence upon the fractional part. Each table stores 256 entries which is why 256×$log_2$ (NUMERATOR) is subtracted in calculating Upointer. It will be understood that the log function at this point returns a fixed point value for use in the pointer calculation, even when the numerator itself has been calculated in floating point form. The multiplication by 256 can be implemented in practice by a suitable choice of this fixed point format. The skilled reader will appreciate that a given implementation will need to take account of any different fixed point number formats that may be being used within the renderer, to ensure that results of calculations are in fact to the appropriate scale.

Alternatively, it would be possible to store one only of these antilog tables, to select a value therefrom in dependence upon the fractional part of the log value, and to shift the selected value by a number of register bit places corresponding to the exponent (integer part of the log value), as described previously. However, although this technique reduces memory usage, it has been found that in a typical microprocessor it is slower than the implementation used in the present embodiment, because of the variable shift operations required.

Referring again to FIG. 10, at steps 234 to 244 renderer 52 repeats steps 222 to 232 for V instead of U. That is, at step 234, it is determined whether $V_r$ is equal to $V_1$, and if it is, $V_r$ is increased slightly at step 236 (to prevent the differential being zero). At step 238, it is determined whether $V_r$ is greater than $V_1$, and if it is, the third least significant bit of register CASE is set to 0 (hyperbola 60 or 64), and the following is set:

$V_{var}=V_r-V_1$

If it is determined at 238 that $V_r$ is not greater than $V_1$, at step 242, the third least significant bit of register CASE is set equal to 1 (hyperbola 62 or 66), and the following is set:

$V_{var}=V_1-V_r$ At step 244, the following are then set:

$NUMERATOR=sR_1R_r(V_{var})$ $Vpointer=AntiLogTable-[256\times log_2(NUMERATOR)]$ At step 246, renderer 52 then sets the following:

$U_{start}=U_1$ $V_{start}=V_1$

ΔDnom=−ΔDnom

At step 248, renderer 52 separates the value of the fractional part of the mantissa of the denominator and the exponent part of the denominator, which has been calculated at step 220 in floating point form. With reference to FIG. 7a, the fractional part is calculated by shifting the bits in the register 100 storing the value of the denominator to the left by eight places and performing a bitwise OR operation on the result and the binary number $2^{31}$. In this way, the fractional part of the mantissa is obtained in bits 0–30 with a value 1 in the most significant bit place (bit 31) of a register (104 in FIG. 7b).

The exponent is separated by shifting the numbers in the register 100 representing the value of the denominator to the right by 23 bit places, subtracting the value 127 (decimal) from the result (which represents the value added to the exponent in order for it to conform with ANSI/IEE standard 754–1985), and then performing a bitwise AND operation on the result with the value 255 (decimal), this providing a result in which the values of the first eight bits in the register are retained and bits 8–31 are masked to zero.

At step 250, the renderer 52 reads the value stored in a log table at the position defined by the mantissa of the denominator. In this embodiment, the log table has 256 entries, and the mantissa of the denominator is shifted in its register to the right by 23 places, so that only the eight most significant bits of its fractional part are used as input to the log table.

At step 252, the values of the first differential and the second differential of the denominator are converted to a fixed point format, normalised with respect to the denominator itself. The way in which this is performed will be described below with reference to FIG. 12.

At this point, the fractional part of the logarithm of the denominator has been found using the log table (step 250). The integer pat of the logarithm of Dnom is simply equal to the exponent of Dnom that was separated in step 248. The inventor has recognised that, in practice, the integer part of the denominator changes relatively infrequently in the course of each span, even though the fractional part may be changing for every pixel. This fact is exploited advantageously in the present embodiment by incorporating the integer part of $\log_2$(Dnom) into the respective antilog table pointers Upointer and Vpointer.

Therefore, at step 254, renderer 52 updates the values of Upointer and Vpointer previously set at steps 232 and 244 respectively, to shift the pointers a whole number of tables to the left or right (FIG. 11a), depending on the exponent. For example, if each table has 256 entries of 4 bytes each, the value of the exponent must be multiplied by 4×256=1024 before being added into the previously set pointer values Upointer or Vpointer, assuming that addressing is in units of bytes in the memory where the antilog tables are stored. This multiplication by 1024 can be implemented as a shift left by ten bit places.

As explained above, at step 252, the values of the first differential ΔDnom and the second differential ΔΔDnom of the denominator are normalised to have the same exponent as the denominator itself. They may then be referred to as "co-normal" with the denominator. This allows simple integer addition to be performed at each pixel step in the span, to generate updated values of ΔDnom and Dnom (additions 78 and 80 in FIG. 6). This normalisation process will now be described with reference to FIG. 12.

Figure 12:
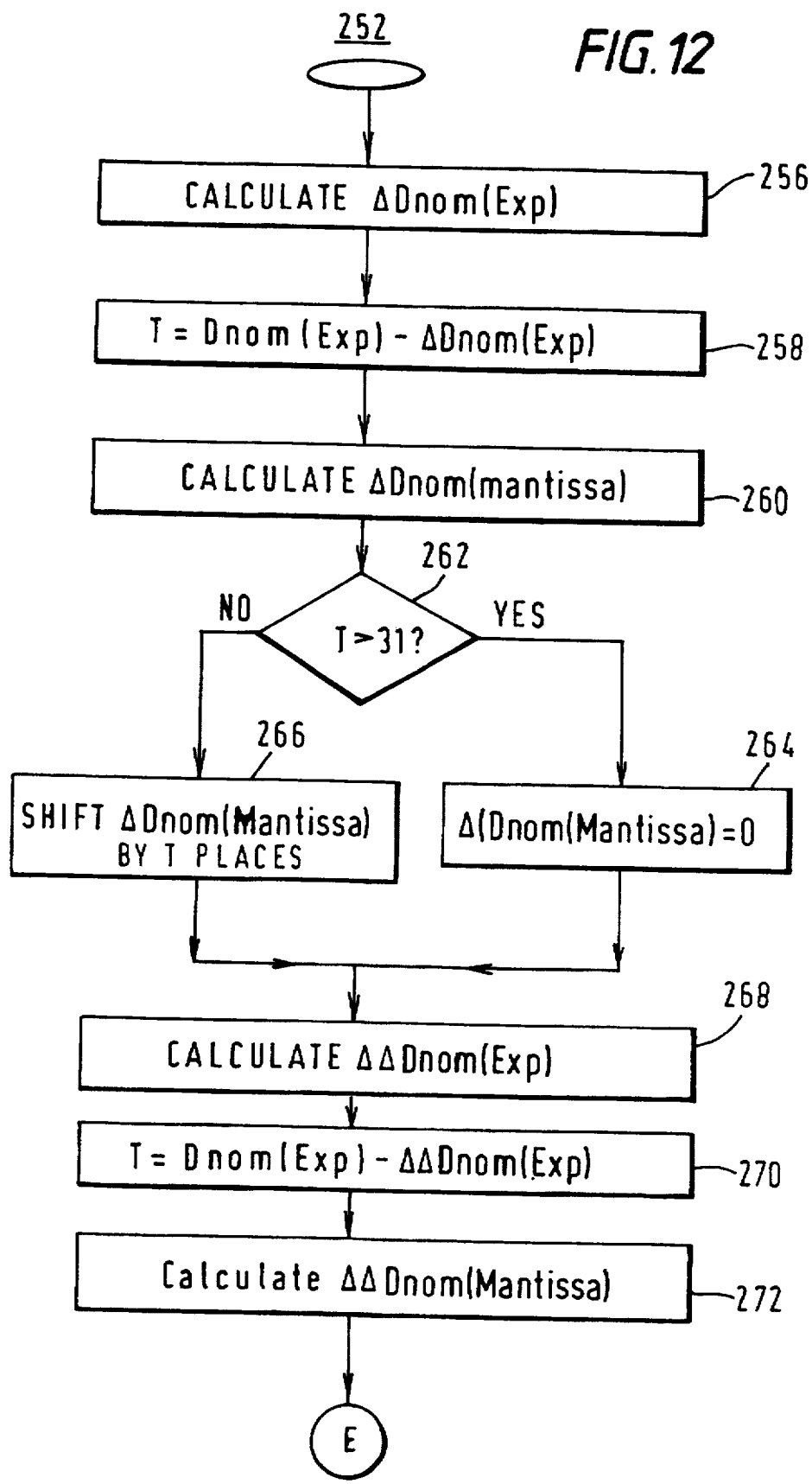
FIG. 12 AND 12 (CONT.) shows the steps performed in step 252 of FIG. 10.
Figure 12:
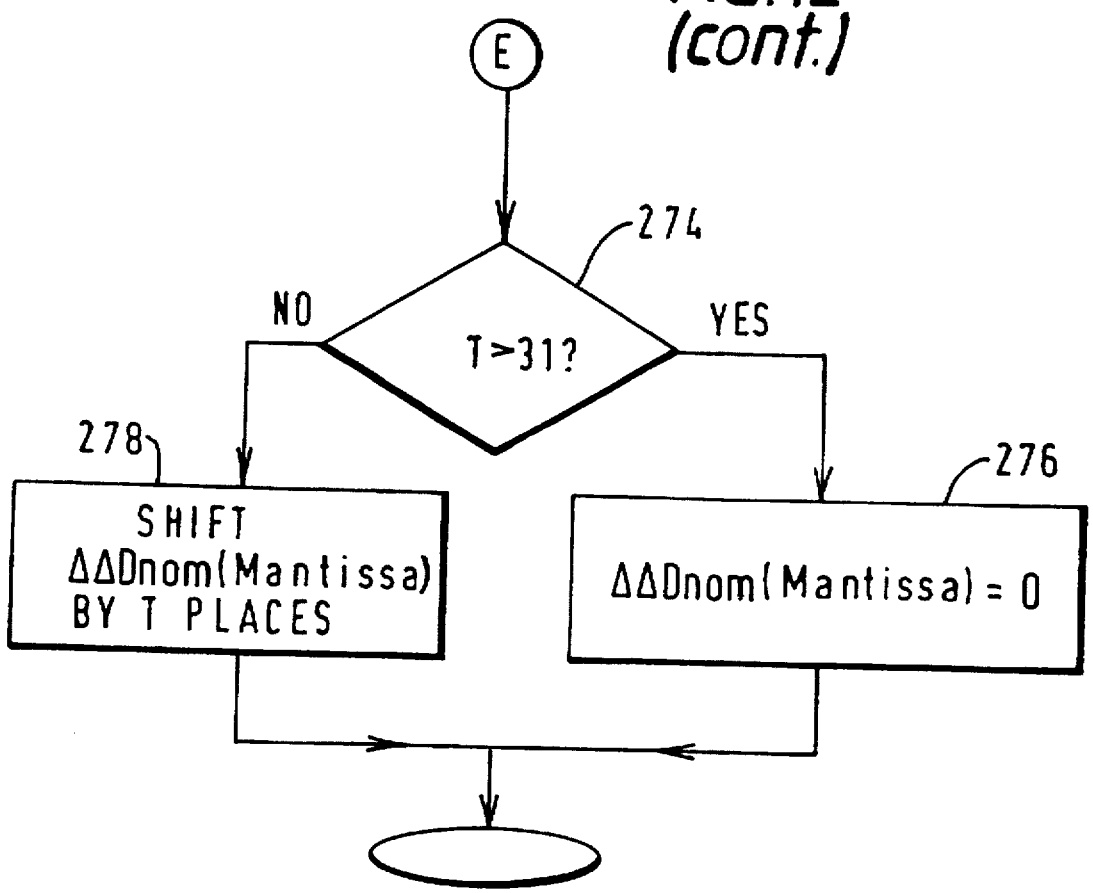

In FIG. 12, at step 256, renderer 52 extracts the value of the exponent of the first differential ΔDnom of the denominator. This is done in the same way as described previously for the extraction of the exponent of the denominator itself in step 248.

In step 258, a temporary variable, T, is set as the difference between the value of the exponent of the denominator itself extracted at step 248 and the value of the exponent of the first differential of the denominator extracted at step 256.

At step 260, the mantissa of the first differential of the denominator is extracted in the same way as the mantissa of the denominator itself was extracted at step 248.

At step 262, a test is performed to determine whether the temporary variable T set at step 258 has a value greater than 31. If it does, the difference between the exponent values of the denominator and the first differential of the denominator is too great to allow the fractional part of the first differential to be normalised to the same exponent as the denominator itself, within a thirty-two bit number range. Accordingly, in this case, at step 264 the mantissa of the first differential of the denominator is set equal to 0. On the other hand, if it is determined at step 262 that the value of T is not greater than 31, at step 266 the fractional part of the first differential of the denominator is shifted to the right in its register by T places (having the effect of reducing the number) to perform the normalisation.

In steps 268 to 278, renderer 52 repeats steps 256 to 266 but this time with respect to the second differential of the denominator. That is, at step 268 the exponent of the second differential of the denominator is extracted in the same way that the exponent of the denominator itself was extracted at step 248, and at step 270, the value of the temporary variable T is set to the difference between the values of the exponent of the denominator itself and the exponent of the second differential of the denominator. At step 272, the mantissa of the second differential of the denominator is extracted in the same way that the mantissa of the denominator itself was extracted at step 248. At step 274 a test is performed to determine whether the temporary value of the variable T set at step 270 is greater than 31. If it is, the mantissa of the second differential of the denominator is set to 0 at step 276, while if it is not, the mantissa of the second differential of the denominator is shifted in its register to the right (thereby having the effect of reducing the number) by T places.

The initialisation process for the span is now complete, and the way in which renderer 52 performs the step of plotting the pixels at step 144 shown in FIG. 9 by an incremental process will now be described with reference to FIGS. 13 to 17.

Figure 13:
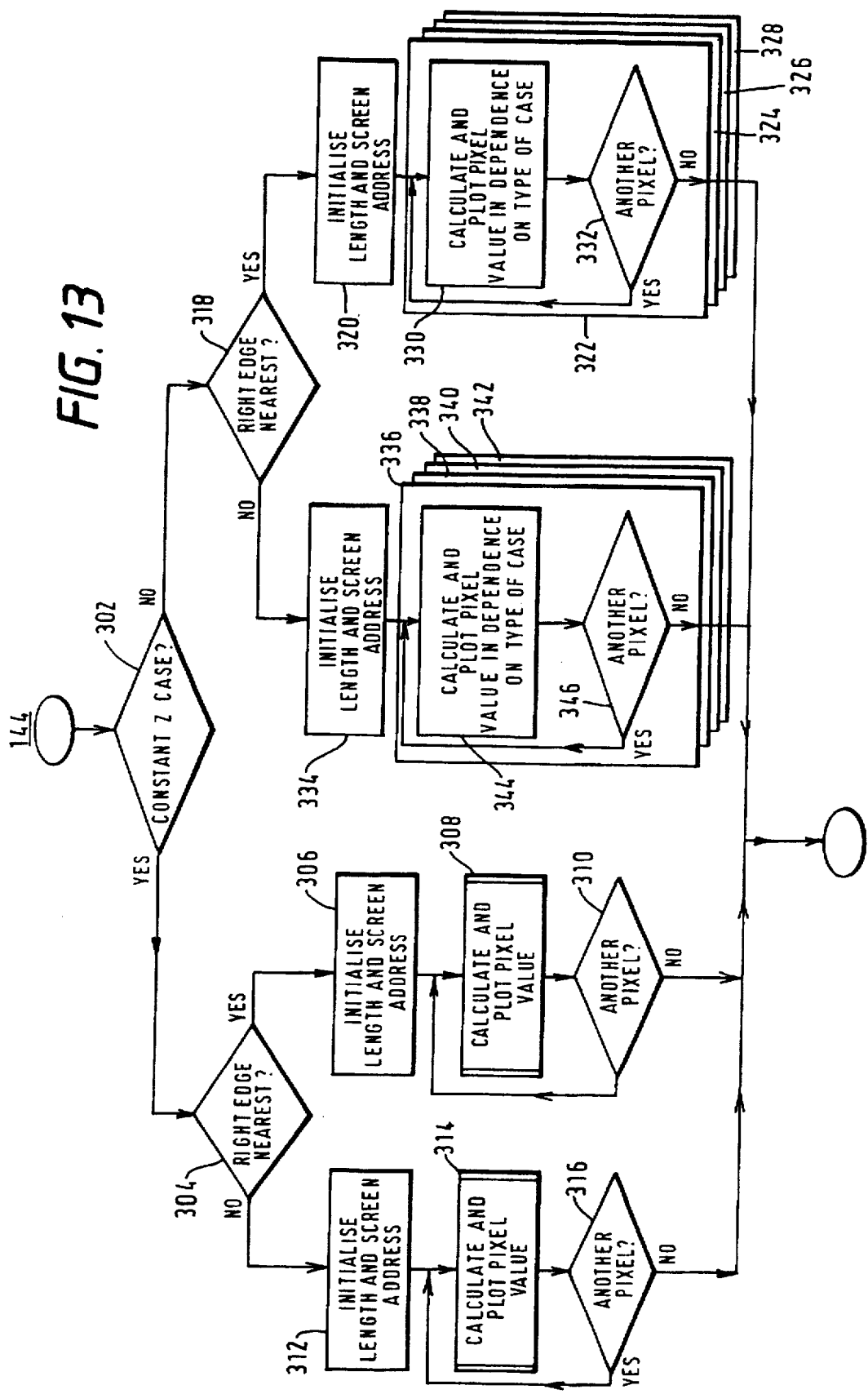
FIG. 13 shows the steps performed in step 144 of FIG. 9.

Referring to FIG. 13, at step 302 renderer 52 determines whether the span is one which lies in a plane of constant depth. This is performed by determining whether the value of the register CASE is equal to 16 (set at step 207 if the span represents a constant Z case). If the value of CASE is equal to 16, then at step 304, it is determined whether the right edge of the polygon is deemed nearer to the viewer than the left edge. If this is the case, then at step 306, the screen address of the first pixel to be plotted is set and the length of the span of pixels remaining to be plotted is set to:

length=s−1

At step 308, the value of the current pixel is calculated and plotted and the length value is decremented, as will be described below. At step 310, renderer 52 determines whether there is another pixel to be plotted (length≧0). While there are more pixels to be plotted, steps 308 and 310 are repeated until all pixels in the span have been plotted.

On the other hand, if it is determined at step 304 that the left edge of the polygon is nearer to the viewer than the right edge, the process proceeds to step 312 where the screen address of the first pixel is set and the length of the span remaining to be plotted is set to:

length=−s

At step 314, the value of the current pixel is calculated and plotted and the length value is incremented, as will be described below. At step 316, a test is performed to determine whether there is another pixel in the span to be plotted (length<0). While there are more pixels to be plotted, steps 314 and 316 are repeated.

Returning to step 302, if it is determined that the span does not represent a constant Z case, then the process proceeds to step 318 where a test is performed to determine whether the right edge of the polygon is deemed nearer to the viewer than the left edge, in the manner described previously. If the right edge is deemed nearer, at step 320, renderer 52 sets the screen address of the first pixel to be plotted and sets the length of the span of pixels to be plotted as follows:

length=s−1

Following step 320, renderer 52 selects one of four separate processing routines 322, 324, 326 or 328 in dependence upon the second and third least significant bits in register CASE set in steps 228, 230, 240 and 242. These bits of register CASE determine the type of hyperbola (described above with reference to FIG. 4) which are to be tracked for U and V respectively.

Within the selected processing routine, at step 330, the value of the current pixel is calculated and plotted in dependence upon the processing routine selected, and the length of the span of pixels remaining to be plotted is decremented, as will be described below.

In step 332, a test is performed to determine whether there are any remaining pixels to be plotted, by determining whether the length of the span is greater than or equal to 0. While there are pixels remaining to be plotted, steps 330 and 332 are repeated.

On the other hand, if it is determined in step 318 that the right edge is not deemed nearer to the viewer than the left edge, the process proceeds to step 334, where the screen address of the first pixel to be plotted is set and the length of the span of pixels remaining to be plotted is set to:

length=−s

Renderer 52 then selects a processing routine 336, 338, 340 or 342 in dependence upon the second and third least significant bits set in register CASE.

Within the selected routine, at step 344, renderer 52 calculates the value of the current pixel in dependence upon the processing routine selected, and increments the length of the span of pixels remaining to be plotted, as will be described below.

At step 346, a test is performed to determine whether there are any remaining pixels in the span, by determining whether the length of the span is less than 0. While there are remaining pixels to be plotted, steps 344 and 346 are repeated.

Figure 14:
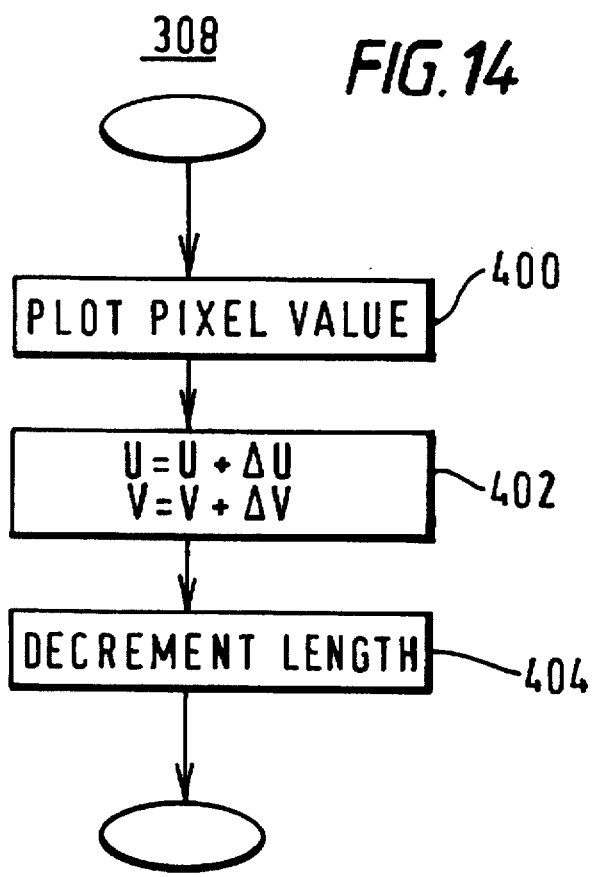
FIG. 14 shows the steps performed in step 308 of FIG. 13.

FIG. 14 shows the steps performed by renderer 52 when calculating and plotting the next pixel value at step 308. At step 400, renderer 52 plots the value of the current pixel, using the current U and V values to look up a texel value from the texture map. At step 402 the value of the texture coordinate U is updated by adding $\Delta U$ (set at step 210 in FIG. 10) and the value of the texture coordinate V is updated by adding the value $\Delta V$ (also set at step 210 in FIG. 10). At step 404, the remaining length of the span of pixels is decremented by 1.

Figure 15:
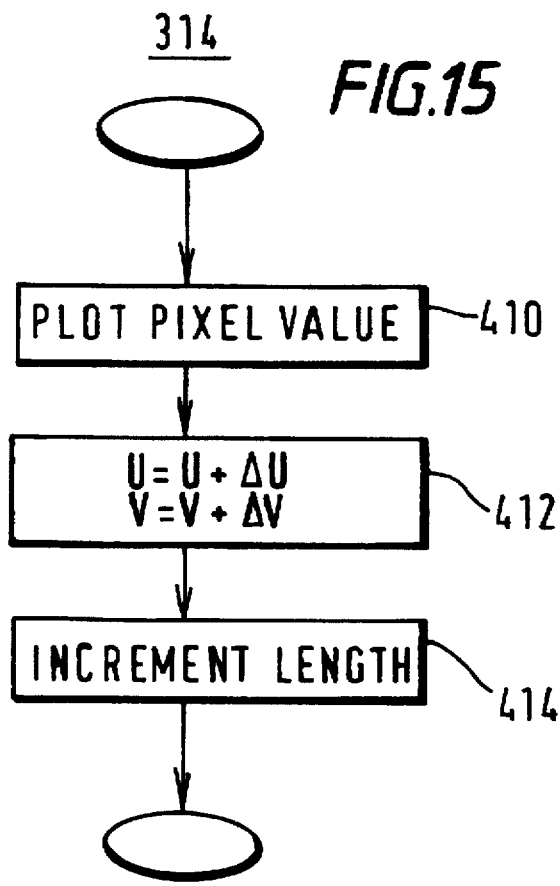
FIG. 15 shows the steps performed in step 314 of FIG. 13.

FIG. 15 shows the procedure performed by renderer 52 in calculating and plotting pixel values at step 314. At step 410, the value of the current pixel is plotted, using the texture coordinates U and V, and at step 412 the values of U and V are updated by adding $\Delta U$ and $\Delta V$ respectively, which were set at step 212 in FIG. 10. At step 414, the value representing the length of span of pixels remaining to be plotted is incremented by 1.

The routine 308 thus effects a linear interpolation of U and V values across the span from right to left. The plotting in step 400 is done by adding the current length value (initially s−1) to a pointer (set at step 306) equal to the address in screen memory where the left most pixel of the span is to be written.

The routine 314 conversely effects a linear interpolation of U and V values across the span from left to right. The plotting in step 410 is done by adding the current length value (initially −s) to a pointer (set at step 312) equal to the address in screen memory where the right most pixel of the span is to be written.

By arranging steps 400 and 410 to use the pointer and length values as just described, the apparatus can be implemented on a common microprocessor to plot a span of pixels very quickly. In particular, the length value is always compared to zero (steps 310, 316), which is quicker than comparison to another value, and avoids the need for an additional register to store that value. Further, the "effective address" for plotting is calculated always by adding the length value to the pointer, which in most microprocessors can be done as part of the memory writing operation, while subtraction cannot.

Figure 16:
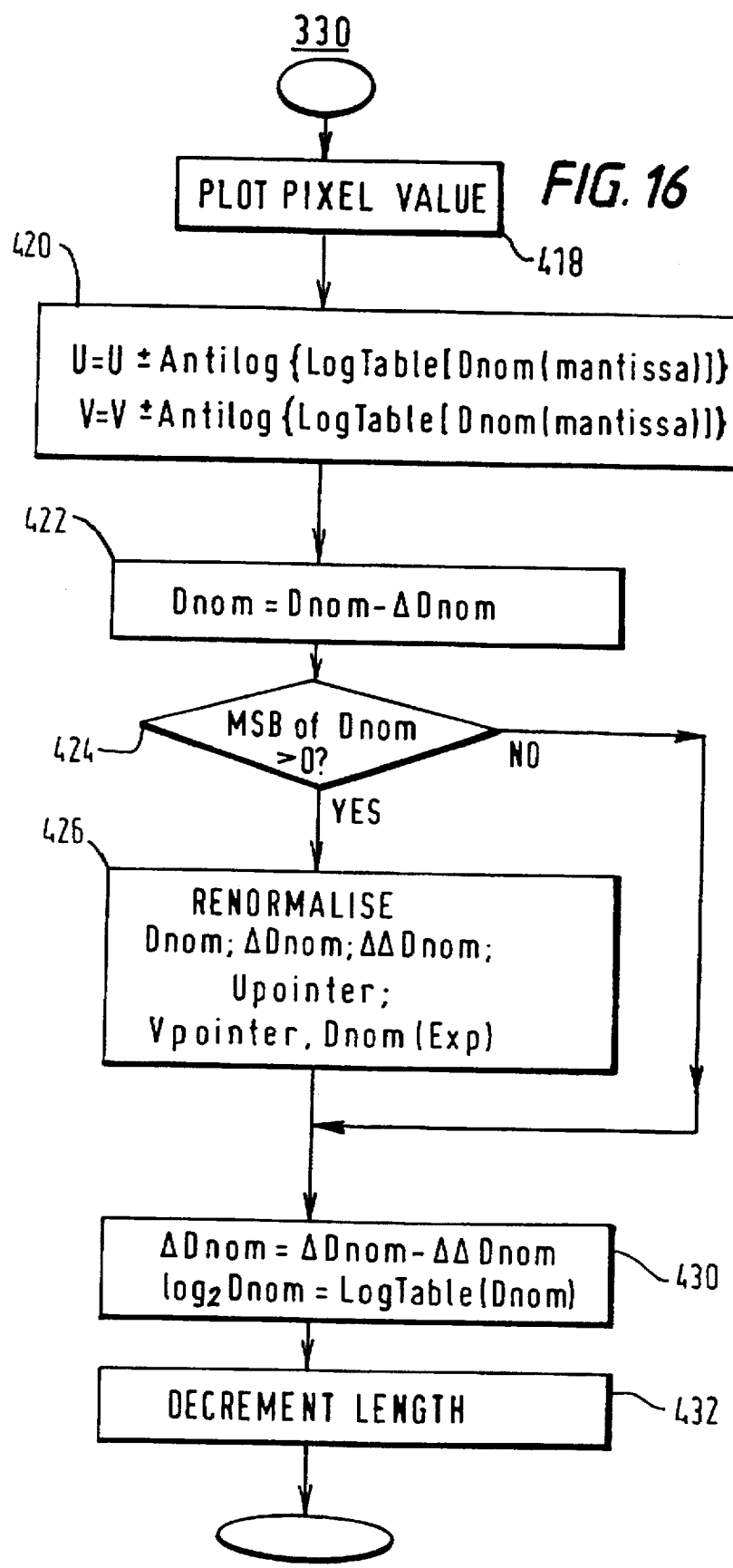
FIG. 16 shows the steps performed in step 330 of FIG. 13.

FIG. 16 shows the steps performed by renderer 52 in calculating and plotting the pixel values at step 330. At step 418, the renderer 52 plots the current pixel value in the manner described above with reference to step 400 (FIG. 14).

At step 420, the values of U and V are updated in dependence upon whether processing routine 322, 324, 326 or 328 is being executed. More particularly, the values are updated as follows:

1) Routine 322 (CASE=001)
U=U+UAntilog{LogTable[Dnom(Mantissa)]}
V=V+VAntilog{LogTable[Dnom(Mantissa)]}

2) Routine 324 (CASE=011)
U=U−UAntilog{LogTable[Dnom(Mantissa)]}
V=V+VAntilog{LogTable[Dnom(Mantissa)]}

3) Routine 326 (CASE=101)
U=U+UAntilog{LogTable[Dnom(Mantissa)]}
V=V−VAntilog{LogTable[Dnom(Mantissa)]}

4) Routine 328 (CASE=111)
U=U−UAntilog{LogTable[Dnom(Mantissa)]}
V=V−VAntilog{LogTable[Dnom(Mantissa)]}

Referring again to FIG. 11a, the U and V values are updated using the same stored antilog table, but this is accessed as two different tables (UAntilog and VAntilog) using the pointers set at steps 232, 244, 254 (FIG. 10). As explained previously, and illustrated in FIG. 11a, these pointers already incorporate the logarithm of the constant numerator, and the exponent of the denominator of the differential of U and V respectively. Therefore, the differential of U or V can be looked up from the antilog table directly, by simply adding the logarithm of the mantissa of the denominator Dnom (looked up initially at step 250 in FIG. 10) to Upointer or Vpointer to obtain an updated pointer to the desired antilog value. As also explained previously, this adding operation can be achieved by "effective address" calculation in a single microprocessor operation which performs the antilog look-up. The antilog table is stored in reverse order to facilitate this, since to subtract a value is not always possible in the effective address calculation.

In step 422, the value Dnom of the mantissa of the denominator is updated by subtracting the normalised value $\Delta$Dnom of the first differential, and at step 424, a check is made to determine whether the most significant bit (bit 31) of the denominator updated at step 422 has become zero. If it has become zero, it is necessary to re-normalise the values of the denominator, the first differential of the denominator, the second differential of the denominator, Upointer, Vpointer and to update the exponent of the denominator, which is done at step 426. More particularly, the values of the denominator, the first differential of the denominator and the second differential of the denominator are normalised by shifting their values to the left by one place in their registers. The values of Upointer and Vpointer are updated as follows:

Upointer=Upointer - (256)

Vpointer=Vpointer - (256)

This implicitly updates the exponent of the denominator as follows:

Dnom(Exp)=Dnom(Exp)−1

This updating is illustrated by the dotted arrows in FIG. 11a for Vpointer, which is effectively moved one whole table (256 entries) lower in memory (4 bytes per entry). Upointer is updated in the same way. The effect of this is to preserve the representation of the integer part of the logarithm of the denominator (the exponent) in the pointers, so that only the fractional part need be looked up in the log table. The exponent Dnom(Exp) need not be stored or updated explicitly, once the pointers have been defined.

It is possible to update the values in this way since in practice the unnormalised values can at most be only one bit position from the required normalised values. Further, normalisation is also always in the downwards direction, because the direction of scanning has been made to ensure increasing depth, and from this scanning direction it also follows that the denominator always decreases in real terms. For ease of implementation, the first differential $\Delta$Dnom is calculated as an unsigned, fixed point number, but subtracted from the denominator at each pixel step.

At step 430, the value of the first differential (stored as an unsigned value) is updated by subtracting the value of the second differential, and the value of the log of the denominator is updated by reading the value from the log table represented by the value of the denominator updated at step 422. Only the eight most significant bits of the fractional part of the mantissa of the denominator are used as input to the log table.

At step 432, the value of the length remaining of the span of pixels is decremented by 1.

Figure 17:
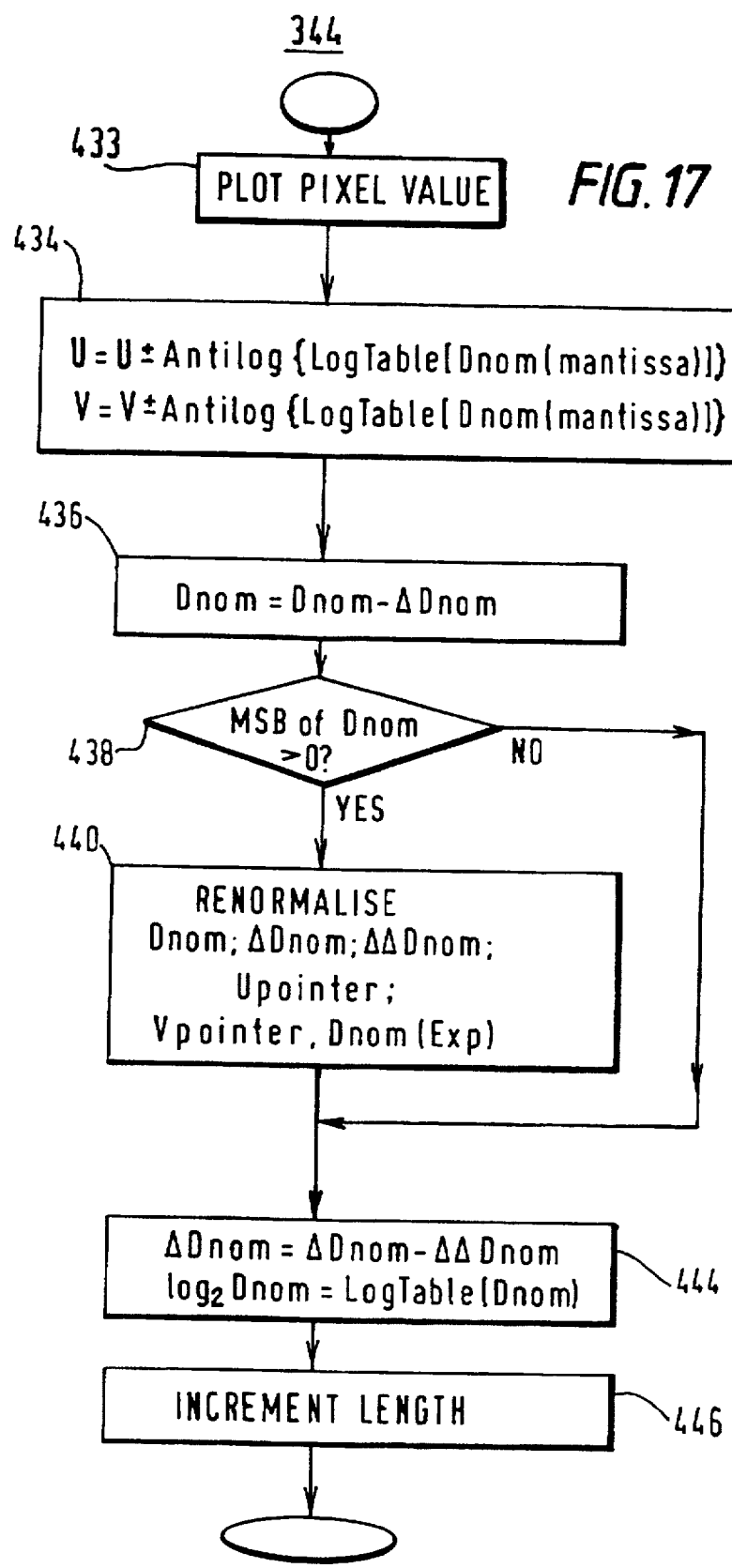
FIG. 17 shows the steps performed in step 334 of FIG. 13.

FIG. 17 shows the steps 433 to 446 performed by renderer 52 in calculating and plotting the pixel values at step 344. The steps 433 to 446 performed in the process shown in FIG. 17 correspond to the steps 418 to 432 described above with respect to FIG. 16 with three exceptions.

Firstly, because the direction of scanning is now from left to right, the plotting of pixels in step 433 is performed in the manner described above with reference to step 410 (FIG. 15).

Secondly, at step 434 in FIG. 17, the values of U and V are updated in accordance with the following equations, in dependence upon which routine 336, 338, 340 or 342 is being executed:

1) Routine 336 (CASE=000)
U=U+UAntilog{LogTable[Dnom(Mantissa)]}
V=V+VAntilog{LogTable[Dnom(Mantissa)]}

2) Routine 338 (CASE=010)
U=U−UAntilog{LogTable[Dnom(Mantissa)]}
V=V+VAntilog{LogTable[Dnom(Mantissa)]}

3) Routine 340 (CASE=100)
U=U+UAntilog{LogTable[Dnom(Mantissa)]}
V=V−VAntilog{LogTable[Dnom(Mantissa)]}

4) Routine 342=CASE 110)
U=U−UAntilog{LogTable[Dnom(Mantissa)]}
V=V−VAntilog{LogTable[Dnom(Mantissa)]}

Thirdly, at step 446, the value of the remaining length of the span of pixels is incremented by 1, rather than decremented.

In the embodiment described above, at step 128 in FIG. 8, the U and V values for the start and end pixels of the span on the given scan line are determined by directly evaluating the appropriate hyperbolic equation (using a division operation). As an alternative, the values of U and V may be tracked down the edges of the polygon using similar algorithms to those detailed above for scanning along the spans. However, direct evaluation of the actual hyperbolic equation will generate the U and V values without accumulating error, thereby increasing accuracy. In any event, the performance of two conventional divisions per scan line is less of a computational burden than the performance of two divisions per pixel. If the tracking method described above is to be used in the vertical direction, however, the visible effect of the accumulated errors can again be minimised by choosing to render upwards from the bottom of the polygon, if the bottom is nearer to the viewer than the top.

Referring to the initial calculation and co-normalisation of the numerator, Dnom, ΔDnom and ΔΔDnom (FIG. 10), it was mentioned above that floating point arithmetic can be used if suitable hardware is available. On the other hand, it is equally possible to perform these calculations entirely using fixed point arithmetic. The exponent of the numerator and the denominator can be found simply by shifting the fixed point values until a '1' appears in the most significant bit, while counting the number of shifts. To normalise the first and second differentials of the denominator, each is simply shifted by the same number of places as the denominator itself.

The exponents obtained by counting are used to initialise the antilog table pointers for U and V exactly as at steps 232, 244 and 254 described above (where the exponents had been extracted from the values of the numerator and denominator calculated in IEEE floating point format). This is a time consuming process, but has only to be performed once per span, whereafter the exponent of the denominator is tracked stepwise and re-normalisation performed occasionally, as already described.

The above techniques provide the advantage of increased speed in performing hyperbolic interpolation for texture mapping or similar operations. In previous systems, pixel values along the span were calculated by evaluating the hyperbolic equations defining the relationship between pixel position and texel position, which involved at least two division operations per pixel (typically costing about 50 cycles for each division alone). However, with the embodiment described above, division operations per pixel are avoided, and replaced with just two table look-up operations.

The renormalisation (steps 426, 440) is necessary approximately $\log_2$(span length) times for a given span length, for example eight or nine times in a span of 500 pixels. This known high probability of branching can be exploited in a pipelined microprocessor such as the Intel Pentium™ microprocessor having branch prediction, to minimise the speed penalty that would otherwise be associated with having an extra branch instruction per pixel.

Moreover, to perform a conventional log look-up operation per pixel would require a normalisation process to be performed on the denominator per pixel to extract the exponent, or else a very large log table would be required. This process would involve a variable length shift operation per pixel, making the log/anitlog implementation of the division impractically slow.

In addition, in the above embodiment, a constant time is required for each texel, which provides particular advantages when "tiling" a repetitive texture since the same time is required for this tiling texture as is required for non-tiling texture.

Figure 18:
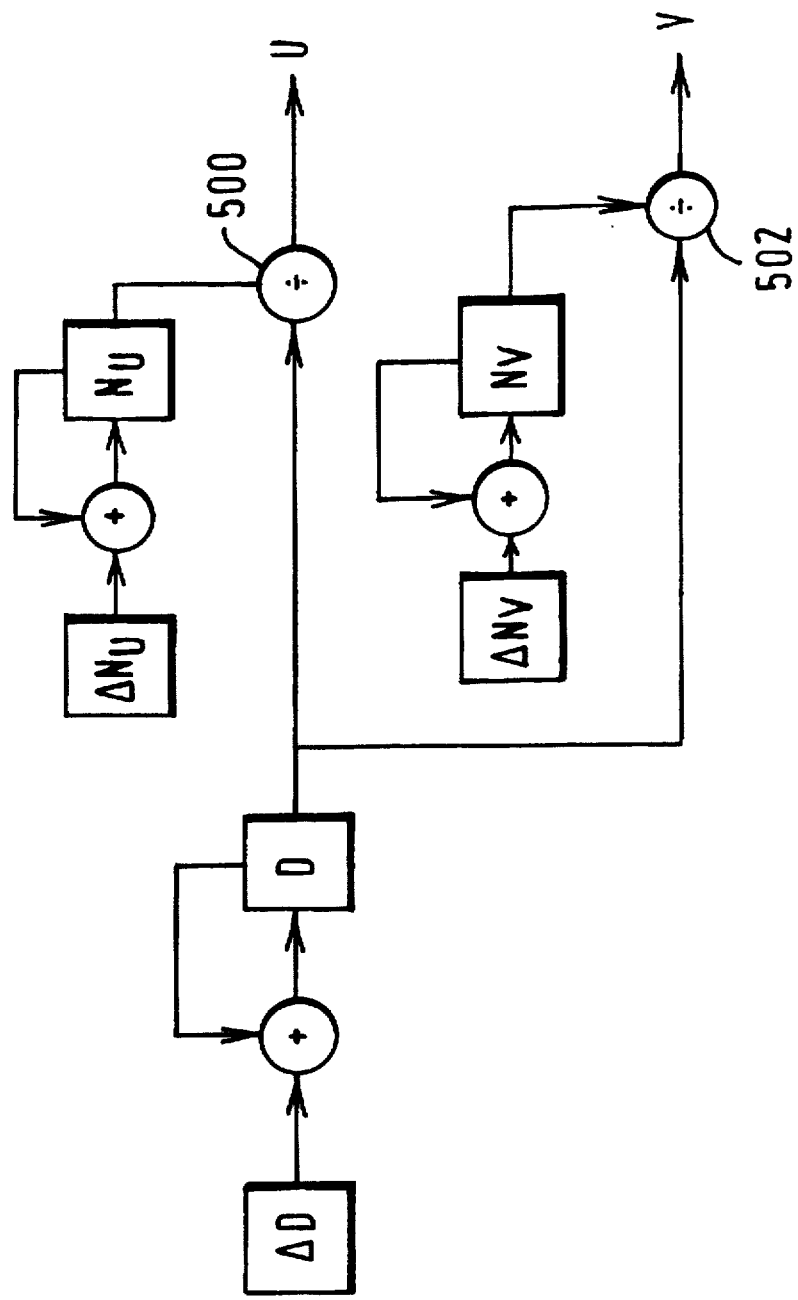
FIG. 18 shows a further embodiment of the invention.

FIG. 18 shows the "direct" implementation of the hyperbolic equations for U and V, as mentioned already in the introduction. Such an implementation has the advantage of reduced accumulated errors in U and V, but of course the divisions 500, 502 still need to be implemented quickly. In an alternative embodiment, therefore, these divisions 500 and 502 are implemented by log/antilog look-up, using the technique of separately tracking the exponent of each numerator, as well as that of the denominator. This avoids the need to extract the exponent of $N_u$, $N_v$ and D per pixel, and in particular avoids the need to shift each value by a variable number of places corresponding to the exponent per pixel, to bring it within the range of the stored log table.

Initialisation of each interpolator (for $N_u$, $N_v$, D) is more complicated than in the above embodiment, since, for the first pixel of each span, there is potentially a need to re-normalise by more than one bit position. Thereafter, however, it can be arranged that, as described above, re-normalisation, when necessary, is always by one place only.

Another drawback of the direct implementation is that the need for re-normalisation has to be tested per pixel independently three times (once each for $N_u$, $N_v$, D), instead of only once, as in the previous embodiments (step 424 or 438, FIGS. 16 and 17). This leads to six possible branching patterns per pixel, and therefore introduces a speed penalty in a heavily pipelined processor such as the Intel Pentium™ microprocessor. Nevertheless, the improved accuracy may be desirable, for example in implementing hyperbolic interpolation down the edges of the polygon (step 128 in FIG. 8).

The skilled person will appreciate that the "texture coordinates" and "texel values" referred to above need not be limited to classic texture mapping where surface colour is modulated by the texel values, but also to other uses of the technique modulating reflectance, transparency, surface normal etc.

The invention is also applicable to the calculation of general parameter values across a projected surface, in addition to mapping coordinates such as U and V. For example, as described in the Blinn reference, it can also be desirable to interpolate between colour values specified at the polygon vertices, using a perspective correct (hyperbolic) interpolation function. In either embodiment (FIG. 6 or FIG. 18), any number of further parameters can be interpolated, each having its own numerator, but using the common denominator.

Also, the skilled person will appreciate that the pixels referred to above may be actual image output pixels as described above, but may alternatively be "sub-pixels" of a larger sub-pixel array, which are then filtered to provide fewer "anti-aliased" pixels for output.

It will be appreciated that these and further modifications and alterations might be made by those skilled in the art without departing from the spirit and scope of the invention.

I claim:

1. In a computer graphics apparatus having (i) a processor for processing signals defining parameters of an object surface to be rendered, (ii) a logarithm table containing logarithm values for numbers within a first range and (iii) an antilogarithm table containing antilogarithm values for numbers within a second range, a method of processing the signals to define pixel values by calculating perspectively correct interpolated values of a surface parameter along a span of pixels of an image representing the object surface, by dividing a numerator by a denominator, the method comprising the steps of:

(a) calculating initial values for the numerator and the denominator;

(b) calculating from the initial value of the denominator function an integer exponent and a mantissa, the mantissa being a number within the first range;

(c) obtaining a logarithm of the numerator;

(d) reading from the logarithm table a logarithm of the mantissa of the denominator;

(e) combining the logarithm of the mantissa obtained in step (d) with (i) the exponent of the denominator and (ii) the logarithm of the numerator to derive a value of the surface parameter for a first pixel using the antilogarithm table, and determining a pixel value from the value of the surface parameter;

(f) repeating steps (d) and (e) for subsequent pixels, and each time:

(i) incrementally updating the mantissa of the denominator to give an updated mantissa;

(ii) re-normalising the updated mantissa if necessary so as to maintain it within the first range; and (iii) updating the exponent of the denominator in response to each re-normalisation in step (f)(ii).

2. A method according to claim 1, wherein:

the logarithm of the numerator is constant for all pixels of the span;

step (f)(i) comprises updating the mantissa of the denominator in accordance with a stored first differential and updating the stored first differential in accordance with a stored second differential; and in step (f)(ii) the stored first and second differentials are re-normalised if necessary so as to remain co-normal with the mantissa of the denominator.

3. A method according to claim 2, wherein the surface parameter values are calculated along the span of pixels in one of a forward direction and a reverse direction such that a distance from the object surface to a viewer of the image always increases for each subsequent pixel.

4. A method according to claim 2, wherein:

step (c) further comprises combining the exponent of the denominator with the logarithm of the numerator to obtain a pointer value;

step (e) is performed by combining the logarithm of the mantissa of the denominator with the pointer value to read the parameter value from the antilogarithm table; and step (f)(iii) is performed by updating the pointer value in response to each re-normalisation.

5. A method according to claim 2, wherein:

step (b) further comprises calculating from the initial value of the numerator an exponent and a mantissa of the numerator, the mantissa of the numerator being a number within the first range;

step (c) is performed by reading the logarithm of the mantissa of the numerator from the logarithm table; and in step (e) the logarithm of the mantissa of the numerator and the logarithm of the mantissa of the denominator are combined to read an antilogarithm value from the antilogarithm table, and the antilogarithm value is shifted a number of bit places determined by the exponents of the numerator and the denominator to obtain the value of the surface parameter.

6. A method according to claim 2, wherein the surface parameter is a first surface parameter and the method further comprises calculating perspectively correct interpolated values of a second surface parameter along the span of pixels by dividing a second numerator by the denominator, and wherein:

step (a) further comprises calculating an initial value for the second numerator;

step (c) further comprises obtaining a logarithm of the second numerator;

step (e) further comprises combining the logarithm of the mantissa of the denominator with the exponent of the denominator and the logarithm of the second numerator to derive a value of the second surface parameter for the first pixel using the antilogarithm table, the pixel value being determined from the value of the first and second surface parameters.

7. A method according to claim 6, wherein:

the first surface parameter and the second surface parameter comprise first differentials of first and second mapping coordinates respectively;

step (a) further comprises defining initial values for said first and second mapping coordinates; step (f) further comprises for each pixel:

(iv) updating each of the first and second mapping coordinates in accordance with the respective differential; and in step (e) said pixel value is determined from the values of the first and second surface parameters by look-up using said mapping coordinates.

8. A method according to claim 1, wherein:

step (b) further comprises calculating from the initial value of the numerator an integer exponent and a mantissa of the numerator, the mantissa of the numerator being a number within the first range;

step (c) comprises reading the logarithm of the mantissa of the numerator from the logarithm table; and step (f) further comprises repeating step (c) and, each time:

(iv) incrementally updating the mantissa of the numerator to obtain an updated mantissa of the numerator;

(v) re-normalising the updated mantissa of the numerator if necessary so as to maintain it within the first range; and (vi) updating the exponent of the numerator in response to each re-normalisation in step f(v).

9. A method according to claim 8, wherein:

step (b) further comprises combining the exponents of the numerator and denominator to calculate a pointer value;

step (e) comprises combining the values of the logarithm of the mantissa of the numerator and the logarithm of the mantissa of the denominator with the pointer value to read the value of the surface parameter from the antilogarithm table; and steps (f) (iii) and (f) (vi) are performed by updating the pointer value in response to each re-normalisation.

10. A method according to claim 8, wherein step (e) comprises combining the values of the logarithm of the mantissa of the numerator and the logarithm of the mantissa of the denominator to read an antilogarithm value from the antilogarithm table, and the antilogarithm value is shifted a number of bit places determined by the exponents of the numerator and the denominator to obtain the value of the surface parameter.

11. A method according to claim 8, wherein:

step (f)(i) comprises updating the mantissa of the denominator in accordance with a stored first differential of the denominator;

step (f)(ii) further comprises re-normalising the stored first differential of the denominator if necessary so that it remains co-normal with the mantissa of the denominator;

step (f)(iv) comprises updating the mantissa of the numerator in accordance with a stored first differential of the numerator; and step (f)(v) further comprises re-normalising the first differential of the numerator if necessary so that it remains co-normal with the mantissa of the numerator.

12. A method according to claim 8, wherein the surface parameter is a first surface parameter and the method further comprises calculating perspectively correct interpolated values of a second surface parameter along the span of pixels by dividing a second numerator by the denominator, and wherein:

step (a) further comprises calculating an initial value for the second numerator;

step (b) further comprises calculating from the initial value of the second numerator an integer exponent and a mantissa of the second numerator, the mantissa of the second numerator being a number within the first range;

step (c) further comprises reading the logarithm of the mantissa of the second numerator from the logarithm table;

step (e) further comprises combining the logarithm of the mantissa of the denominator and the logarithm of the mantissa of the second numerator with the exponents of the denominator and the second numerator to derive a value of the second surface parameter for the first pixel using the antilogarithm table, the pixel value being determined by table look-up using said first and second surface parameter values;

step (f)(iv) further comprises incrementally updating the mantissa of the second numerator to obtain an updated mantissa of the second numerator;

step (f)(v) further comprises re-normalising the updated mantissa of the second numerator if necessary to maintain it within the first range; and step (f) (vi) further comprises updating the exponent of the second numerator in response to each re-normalisation of the mantissa of the second numerator.

13. In a computer graphics apparatus having a processor for processing signals defining parameters of an object surface to be rendered, a method of processing the signals to interpolate in a perspectively correct manner a first surface parameter along a span of pixels of an image representing the object surface, which surface is represented with correct perspective in the image, and which first surface parameter varies along the span in accordance with a first hyperbolic function, the first hyperbolic function having a first gradient which has a constant first numerator and a variable denominator, the method comprising the steps of:

(a) determining an initial value of the first surface parameter for a first one of the pixels and determining respective initial values of the first numerator and the denominator;

(b) calculating values of the first surface parameter for subsequent pixels of the span in a stepwise manner, the calculating step (b) for each subsequent pixel including, in an appropriate order the steps:

(i) calculating a value of the first gradient by dividing the value of the first numerator by the value of the denominator;

(ii) updating the value of the first surface parameter in accordance with the value of the first gradient to generate an interpolated value of the first surface parameter; and (iii) updating the value of the denominator; and (c) generating respective pixel values for pixels of the span in accordance with the interpolated values of the first surface parameter.

14. A method according to claim 13, wherein a second surface parameter is also interpolated along the span of pixels in accordance with a second hyperbolic function, the second hyperbolic function having a second gradient which has a constant second numerator and a denominator equal to the denominator of the first gradient, wherein:

step (a) further comprises determining respective initial values for the second surface parameter and the second numerator;

step (b)(i) further comprises calculating a value of the second gradient by dividing the value of the second numerator by the value of the denominator;

step (b)(ii) further comprises updating the value of the second surface parameter value in accordance with the value of the gradient to generate an interpolated value of the second surface parameter; and wherein in step (c) each pixel value is generated in accordance with interpolated values of both the first and second surface parameters.

15. A method according to claim 14, wherein the first and second surface parameters are mapping coordinates, and wherein in step (c) each pixel value is generated by reading a value from storage addressed by the interpolated values of the first and second surface parameters.

16. A method according to claim 13, wherein the denominator has a variable first differential and a constant second differential, and wherein:

step (a) further comprises determining respective initial values for the first differential and the second differential;

step (b)(iii) is performed by updating the value of the denominator in accordance with the value of the first differential; and step (b) further comprises:
(iv) updating the value of the first differential in accordance with the value of the second differential.

17. A method according to claim 13, wherein the surface parameter is interpolated along the span of pixels in one of a forward direction and a reverse direction, such that a distance from the object surface to a viewer of the image always increases for each subsequent pixel.

18. In a computer graphics apparatus having a processor for processing signals defining parameters of an object surface to be rendered, a method of processing the signals to calculate perspectively correct interpolated values of a first surface parameter along a line of pixels of an image representing the object surface, which surface is represented with correct perspective in the image, the interpolated values being calculated such that the interpolated value at each successive pixel contains an error larger than the error at a previous pixel, the method comprising the steps of:

determining whether a first edge of the object surface has a greater depth than a second edge of the object surface;

calculating the interpolated values in a first direction along the line of pixels if the first edge has a greater depth than the second edge; and calculating the interpolated values in a second direction along the line of pixels if the second edge has a greater depth than the first edge.

19. A method according to claim 18, wherein the interpolated values are calculated in the first direction and the second direction such that the errors accumulate as the object surface depth increases.

20. A storage medium containing computer readable program comprising code for controlling a programmable apparatus such that, when the code is loaded into the apparatus, the apparatus is programmed to perform a method according to any one of claims 1–19.

21. An electronic graphics apparatus, comprising:

a store for storing a logarithm table containing logarithm values for numbers within a first range and an antilogarithm table containing antilogarithm values for numbers within a second range; and a processor for processing signals defining parameters of an object surface to be rendered to define pixel values by calculating perspectively correct interpolated values of a surface parameter along a span of pixels of an image representing the object surface, by dividing a numerator by a denominator, the processor comprising:

(a) means for calculating initial values for the numerator and the denominator;

(b) means for calculating from the initial value of the denominator function an integer exponent and a mantissa, the mantissa being a number within the first range;

(c) means for obtaining a logarithm of the numerator;

(d) means for reading from the logarithm table a logarithm of the mantissa of the denominator;

(e) means for combining the logarithm of the mantissa obtained by means (d) with (i) the exponent of the denominator and (ii) the logarithm of the numerator to derive a value of the surface parameter for a first pixel using the antilogarithm table, and for determining a pixel value from the value of the surface parameter;

(f) means for causing repeated operation of means (d) and (e) for subsequent pixels, and further comprising means operated during each repeated operation for:
(i) incrementally updating the mantissa of the denominator to give an updated mantissa;
(ii) re-normalising the updated mantissa if necessary so as to maintain it within the first range; and
(iii) updating the exponent of the denominator in response to each re-normalisation of the updated mantissa.

22. Apparatus according to claim 21, wherein:

the logarithm of the numerator is constant for all pixels of the span;

means (f)(i) operates by updating the mantissa of the denominator in accordance with a stored first differential and by updating the stored first differential in accordance with a stored second differential; and means (f)(ii) operates also to re-normalise the stored first and second differentials if necessary so as to maintain them co-normal with the mantissa of the denominator.

23. Apparatus according to claim 22, wherein the processor is operated to calculate the surface parameter values along the span of pixels in one of a forward direction and a reverse direction such that a distance from the object surface to a viewer of the image always increases for each subsequent pixel.

24. Apparatus according to claim 22, wherein:

means (c) further comprises means for combining the exponent of the denominator with the logarithm of the numerator to obtain a pointer value;

means (e) operates by combining the logarithm of the mantissa of the denominator with the pointer value to read the parameter value from the antilogarithm table; and means (f)(iii) operates by updating the pointer value in response to each re-normalisation.

25. Apparatus according to claim 22, wherein:

means (b) further comprises means for calculating from the initial value of the numerator an exponent and a mantissa of the numerator, the mantissa of the numerator being a number within the first range;

means (c) operates by reading the logarithm of the mantissa of the numerator from the logarithm table; and means (e) is operated such that the logarithm of the mantissa of the numerator and the logarithm of the mantissa of the denominator are combined to read an antilogarithm value from the antilogarithm table, and the antilogarithm value is shifted a number of bit places determined by the exponents of the numerator and the denominator to obtain the value of the surface parameter.

26. Apparatus according to claim 22, wherein the surface parameter is a first surface parameter and the processor further comprises means for calculating perspectively correct interpolated values of a second surface parameter along the span of pixels by dividing a second numerator by the denominator, and wherein:

means (a) further comprises means for calculating an initial value for the second numerator;

means (c) further comprises means for obtaining a logarithm of the second numerator;

means (e) further comprises means for combining the logarithm of the mantissa of the denominator with the exponent of the denominator and the logarithm of the second numerator to derive a value of the second surface parameter for the first pixel using the antilogarithm table, the pixel value being determined from the value of the first and second surface parameters.

27. Apparatus according to claim 26, wherein:

the first surface parameter and the second surface parameter comprise first differentials of first and second mapping coordinates respectively;

means (a) further comprises means for defining initial values for said first and second mapping coordinates;

means (f) further comprises means operated for each pixel for:

(iv) updating each of the first and second mapping coordinates in accordance with the respective differential; and means (e) operates to determine said pixel value from the values of the first and second surface parameters by look-up using said mapping coordinates.

28. Apparatus according to claim 21, wherein:

means (b) further comprises means for calculating from the initial value of the numerator an integer exponent and a mantissa of the numerator, the mantissa of the numerator being a number within the first range;

means (c) operates by reading the logarithm of the mantissa of the numerator from the logarithm table; and means (f) is operated to cause repeated operation of means (c), and further comprises means operated each time for:

(iv) incrementally updating the mantissa of the numerator to obtain an updated mantissa of the numerator;

(v) re-normalising the updated mantissa of the numerator if necessary so as to maintain it within the first range; and (vi) updating the exponent of the numerator in response to each re-normalisation of the updated mantissa of the numerator.

29. Apparatus according to claim 28, wherein:

means (b) further comprises means for combining the exponents of the numerator and denominator to calculate a pointer value;

means (e) operates by combining the values of the logarithm of the mantissa of the numerator and the logarithm of the mantissa of the denominator with the pointer value to read the value of the surface parameter from the antilogarithm table; and means (f)(iii) and (f)(vi) operate by updating the pointer value in response to each re-normalisation.

30. Apparatus according to claim 28, wherein means (e) operates by combining the values of the logarithm of the mantissa of the numerator and the logarithm of the mantissa of the denominator to read an antilogarithm value from the antilogarithm table, and by shifting the antilogarithm value a number of bit places determined by the exponents of the numerator and the denominator to obtain the value of the surface parameter.

31. Apparatus according to claim 28, wherein:

means (f)(i) operates by updating the mantissa of the denominator in accordance with a stored first differential of the denominator;

means (f)(ii) further comprises means for re-normalising the stored first differential of the denominator if necessary so that it remains co-normal with the mantissa of the denominator;

means (f)(iv) operates by updating the mantissa of the numerator in accordance with a stored first differential of the numerator; and means (f)(v) further comprises means for re-normalising the first differential of the numerator if necessary so that it remains co-normal with the mantissa of the numerator.

32. Apparatus according to claim 28, wherein the surface parameter is a first surface parameter and the processor further comprises means for calculating perspectively correct interpolated values of a second surface parameter along the span of pixels by dividing a second numerator by the denominator, and wherein:

means (a) further comprises means for calculating an initial value for the second numerator;

means (b) further comprises means for calculating from the initial value of the second numerator an integer exponent and a mantissa of the second numerator, the mantissa of the second numerator being a number within the first range;

means (c) further comprises means for reading the logarithm of the mantissa of the second numerator from the logarithm table;

means (e) further comprises means for combining the logarithm of the mantissa of the denominator and the logarithm of the mantissa of the second numerator with the exponents of the denominator and the second numerator to derive a value of the second surface parameter for the first pixel using the antilogarithm table, the pixel value being determined by table look-up using said first and second surface parameter values;

means (f)(iv) further comprises means for incrementally updating the mantissa of the second numerator to obtain an updated mantissa of the second numerator;

means (f)(v) further comprises means for re-normalising the updated mantissa of the second numerator if necessary to maintain it within the first range; and means (f)(vi) further comprises means for updating the exponent of the second numerator in response to each re-normalisation of the mantissa of the second numerator.

33. An electronic graphics apparatus for processing signals defining parameters of an object surface to be rendered to interpolate in a perspectively correct manner a first surface parameter along a span of pixels of an image representing the object surface, which surface is represented with correct perspective in the image, and which first surface parameter varies along the span in accordance with a first hyperbolic function, the first hyperbolic function having a first gradient which has a constant first numerator and a variable denominator, the apparatus comprising:

(a) means for determining an initial value of the first surface parameter for a first one of the pixels and for determining respective initial values of the first numerator and the denominator;

(b) means for calculating values of the first surface parameter for subsequent pixels of the span in a stepwise manner, means (b) comprising:

(i) means for calculating a value of the first gradient by dividing the value of the first numerator by the value of the denominator;

(ii) means for updating the value of the first surface parameter in accordance with the value of the first gradient to generate an interpolated value of the first surface parameter; and (iii) means for updating the value of the denominator; and (c) means for generating respective pixel values for pixels of the span in accordance with the interpolated values of the first surface parameter.

34. Apparatus according to claim 33, operated to interpolate a second surface parameter along the span of pixels in accordance with a second hyperbolic function, the second hyperbolic function having a second gradient which has a constant second numerator and a denominator equal to the denominator of the first gradient, wherein:

means (a) further comprises means for determining respective initial values for the second surface parameter and the second numerator;

means (b) (i) further comprises means for calculating a value of the second gradient by dividing the value of the second numerator by the value of the denominator;

means (b)(ii) further comprises means for updating the value of the second surface parameter value in accordance with the value of the gradient to generate an interpolated value of the second surface parameter; and wherein means (c) operates to generate each pixel value in accordance with interpolated values of both the first and second surface parameters.

35. Apparatus according to claim 34, wherein the first and second surface parameters are mapping coordinates, and wherein means (c) operates to generate each pixel value by reading a value from storage addressed by the interpolated values of the first and second surface parameters.

36. Apparatus according to claim 33, wherein the denominator has a variable first differential and a constant second differential, and wherein:

means (a) further comprises means for determining respective initial values for the first differential and the second differential;

means (b)(iii) operates by updating the value of the denominator in accordance with the value of the first differential; and means (b) further comprises:

(iv) means for updating the value of the first differential in accordance with the value of the second differential.

37. Apparatus according to claim 33, wherein the processor is operated such that the surface parameter is interpolated along the span of pixels in one of a forward direction and a reverse direction, such that a distance from the object surface to a viewer of the image always increases for each subsequent pixel.

38. An electronic graphics apparatus for processing signals defining parameters of an object surface to be rendered to calculate perspectively correct interpolated values of a first surface parameter along a line of pixels of an image representing the object surface, which surface is represented with correct perspective in the image, the interpolated values being calculated such that the interpolated value at each successive pixel contains an error larger than the error at a previous pixel, the apparatus comprising:

means for determining whether a first edge of the object surface has a greater depth than a second edge of the object surface;

means for calculating the interpolated values in a first direction along the line of pixels if the first edge has a greater depth than the second edge; and means for calculating the interpolated values in a second direction along the line of pixels if the second edge has a greater depth than the first edge.

39. Apparatus according to claim 38, operated such that the interpolated values are calculated in the first direction and the second direction such that the errors accumulate as the object surface depth increases.

40. An apparatus according to claim 21, 33 or 38, further comprising display means for processing the pixel values to display a two-dimensional image of the object surface.

41. An apparatus according to claim 21, 33 or 38, further comprising a frame buffer memory for storing the pixel values.

* * * * *

UNITED STATES PATENT AND TRADEMARK OFFICE
CERTIFICATE OF CORRECTION

PATENT NO. : 5,777,623
DATED : July 7, 1998
INVENTOR(S) : JONATHAN ANDREW STANLEY SMALL It is certified that error appears in the above-identified patent and that said Letters Patent is hereby corrected as shown below:

COLUMN 6

Line 56, "numerator . Al so," should read -- numerator. Also,--.

COLUMN 8

Line 22, "$\Delta t=2^{(log2(Num)-log^2(Dnom))}$" should read -- $\Delta t=2^{(log2(Num)-log2(Dnom))}$ --.

COLUMN 9

Line 3, "render" should read --renderer--; and
Line 41, "scan" should read --the scan--.

COLUMN 13

Line 19, "it" should read --if it--;
Line 20, "than at" should read --then at--; and
Line 46, "part" should read --parts--.

COLUMN 14

Line 20, "At step 244," should read --¶ At step 244--;
Line 25, "$U_{start=U1}$" should read --$U_{start}=U_1$--;
Line 26, "$V_{start=V1}$" should read --$V_{start}=V_1$--; and
Line 62, "pat" should read --part--.

COLUMN 17

Line 35, "left most" should read --leftmost--; and
Line 41, "right most" should read --rightmost--.

UNITED STATES PATENT AND TRADEMARK OFFICE
CERTIFICATE OF CORRECTION

PATENT NO. : 5,777,623
DATED : July 7, 1998
INVENTOR(S) : JONATHAN ANDREW STANLEY SMALL It is certified that error appears in the above-identified patent and that said Letters Patent is hereby corrected as shown below:

COLUMN 22

Line 59, "coordinates; step (f)" should read
        --coordinates; ¶ step (f)--.

COLUMN 25

Line 45, "computer readable" should read
        --a computer-readable--.

Signed and Sealed this

Sixth Day of July, 1999

Attest:

Q. TODD DICKINSON

*Attesting Officer*     Acting Commissioner of Patents and Trademarks